US009043386B2

(12) United States Patent
Halevi et al.

(10) Patent No.: US 9,043,386 B2
(45) Date of Patent: May 26, 2015

(54) SYSTEM AND METHOD FOR SYNCHRONIZING COLLABORATIVE FORM FILLING

(75) Inventors: Zeev Halevi, Haifa (IL); Ivgeny Rafalovich, Gan-Ner (IL)

(73) Assignee: HBR LABS INC., Farmington Hills, MI (US)

( * ) Notice: Subject to any disclaimer, the term of this patent is extended or adjusted under 35 U.S.C. 154(b) by 794 days.

(21) Appl. No.: 13/241,801

(22) Filed: Sep. 23, 2011

(65) Prior Publication Data

US 2012/0089659 A1    Apr. 12, 2012

Related U.S. Application Data

(60) Provisional application No. 61/390,439, filed on Oct. 6, 2010.

(51) Int. Cl.
| G06F 13/00 | (2006.01) |
| G06Q 10/10 | (2012.01) |
| G06F 17/24 | (2006.01) |

(52) U.S. Cl.
CPC ............ G06Q 10/101 (2013.01); G06F 17/243 (2013.01)

(58) Field of Classification Search
CPC .............. H04L 29/08072; H04L 29/06; H04L 29/08135; H04L 29/08144; H04L 29/0809; G06Q 10/101; G06F 17/243
USPC .................................................. 709/201, 203
See application file for complete search history.

(56) References Cited

U.S. PATENT DOCUMENTS

| 6,175,808 | B1 | 1/2001 | Chai |
| 6,266,805 | B1 | 7/2001 | Nwana et al. |
| 6,845,390 | B1 * | 1/2005 | Jorgenson et al. ............ 709/205 |
| 7,685,631 | B1 | 3/2010 | Paya et al. |
| 7,702,730 | B2 | 4/2010 | Spataro et al. |
| 7,733,366 | B2 | 6/2010 | Beavers et al. |
| 8,200,764 | B2 * | 6/2012 | Quinn et al. .................. 709/206 |
| 2001/0037367 | A1 | 11/2001 | Lyer |

(Continued)

FOREIGN PATENT DOCUMENTS

WO    2008/102364    8/2008

OTHER PUBLICATIONS

International Search Report, PCT/US2010/29819, Date of Mailing May 24, 2010.

(Continued)

*Primary Examiner* — Robert B Harrell
(74) *Attorney, Agent, or Firm* — The Dobrusin Law Firm, PC

(57) ABSTRACT

The present invention relates to systems and method for synchronizing collaborative web applications, such as collaborative form filling using a message bus server and HTTP protocol. The method includes delivering compatible plug-ins to a first and a second user so that the users may substantially simultaneously access compatible plug-ins and operate the plug-ins in a coordinated substantially synchronized manner for modifying and/or observing a common file. The process includes delivering a collaborative form to the users. Following the modification of the collaborative form by one of the users, the modification is communicated to a different user. The communication is substantially simultaneous with the modification and takes place by serializing the modification to string and sending the string using HTTP.

22 Claims, 19 Drawing Sheets

(56) References Cited

U.S. PATENT DOCUMENTS

| | | | |
|---|---|---|---|
| 2002/0065912 A1* | 5/2002 | Catchpole et al. | 709/224 |
| 2003/0005180 A1 | 1/2003 | Schmit et al. | |
| 2003/0018719 A1 | 1/2003 | Ruths et al. | |
| 2003/0041108 A1 | 2/2003 | Henrick et al. | |
| 2003/0200114 A1 | 10/2003 | Ogino et al. | |
| 2004/0019539 A1 | 1/2004 | Raman et al. | |
| 2004/0091135 A1 | 5/2004 | Bourg et al. | |
| 2004/0215564 A1 | 10/2004 | Lawlor et al. | |
| 2004/0243672 A1 | 12/2004 | Markki et al. | |
| 2005/0097440 A1 | 5/2005 | Lusk et al. | |
| 2005/0108274 A1 | 5/2005 | Selman et al. | |
| 2005/0108330 A1 | 5/2005 | Sakaguchi et al. | |
| 2005/0114475 A1 | 5/2005 | Chang et al. | |
| 2005/0243924 A1 | 11/2005 | Lecomte et al. | |
| 2006/0000900 A1 | 1/2006 | Fernandes et al. | |
| 2006/0010095 A1 | 1/2006 | Wolff et al. | |
| 2006/0053380 A1 | 3/2006 | Spataro et al. | |
| 2006/0155742 A1 | 7/2006 | Stanev | |
| 2006/0224470 A1 | 10/2006 | Ruano et al. | |
| 2007/0088707 A1 | 4/2007 | Durgin et al. | |
| 2007/0100834 A1 | 5/2007 | Landry et al. | |
| 2007/0143493 A1 | 6/2007 | Mullig et al. | |
| 2007/0198534 A1 | 8/2007 | Hon et al. | |
| 2007/0207782 A1 | 9/2007 | Tran | |
| 2008/0091750 A1 | 4/2008 | Zadrozny et al. | |
| 2008/0147834 A1* | 6/2008 | Quinn et al. | 709/223 |
| 2008/0155104 A1 | 6/2008 | Quinn et al. | |
| 2009/0187453 A1* | 7/2009 | Dill et al. | 705/9 |
| 2010/0037320 A1 | 2/2010 | Moed et al. | |
| 2010/0257451 A1 | 10/2010 | Halevi et al. | |

OTHER PUBLICATIONS

International Search Report, PCT/IL2008/00235, Publication Date Feb. 25, 2010.

Visualized Development Tool for Building Coding-Phase Collaborations in Virtual World, Dec. 30, 2009.

ActionScript Vs. JavaScript, Visualized Development Tool, Apr. 2007, http://positionabsolute.net/blog/2007/04/actionscript-vs-javascript.php.

* cited by examiner

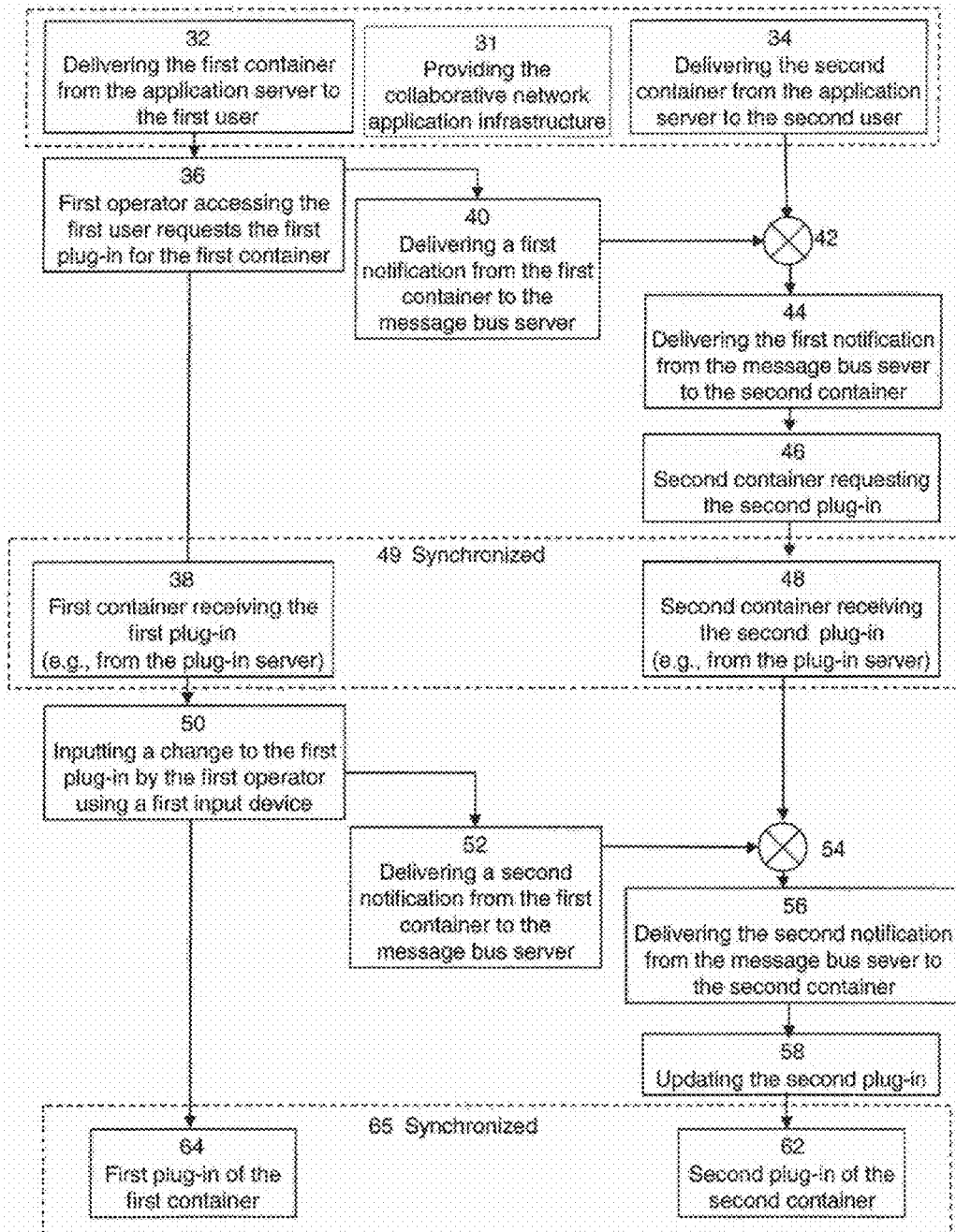

| Optional two way audio/video or telephony – e.g. VOIP application | Tabs – each plug-in in a separate tab |
|---|---|
| | The plug-in invocation area |
| Annotation ToolBox: provides annotation capabilities like drawing, highlighting, adding text and save-to-pdf on top of all plug-ins etc. | |
| Textual chat with presenter and all viewers | |
| Participants list with handing-over-control mechanism | |

FIG. 9

(Session Initiation flow chart)

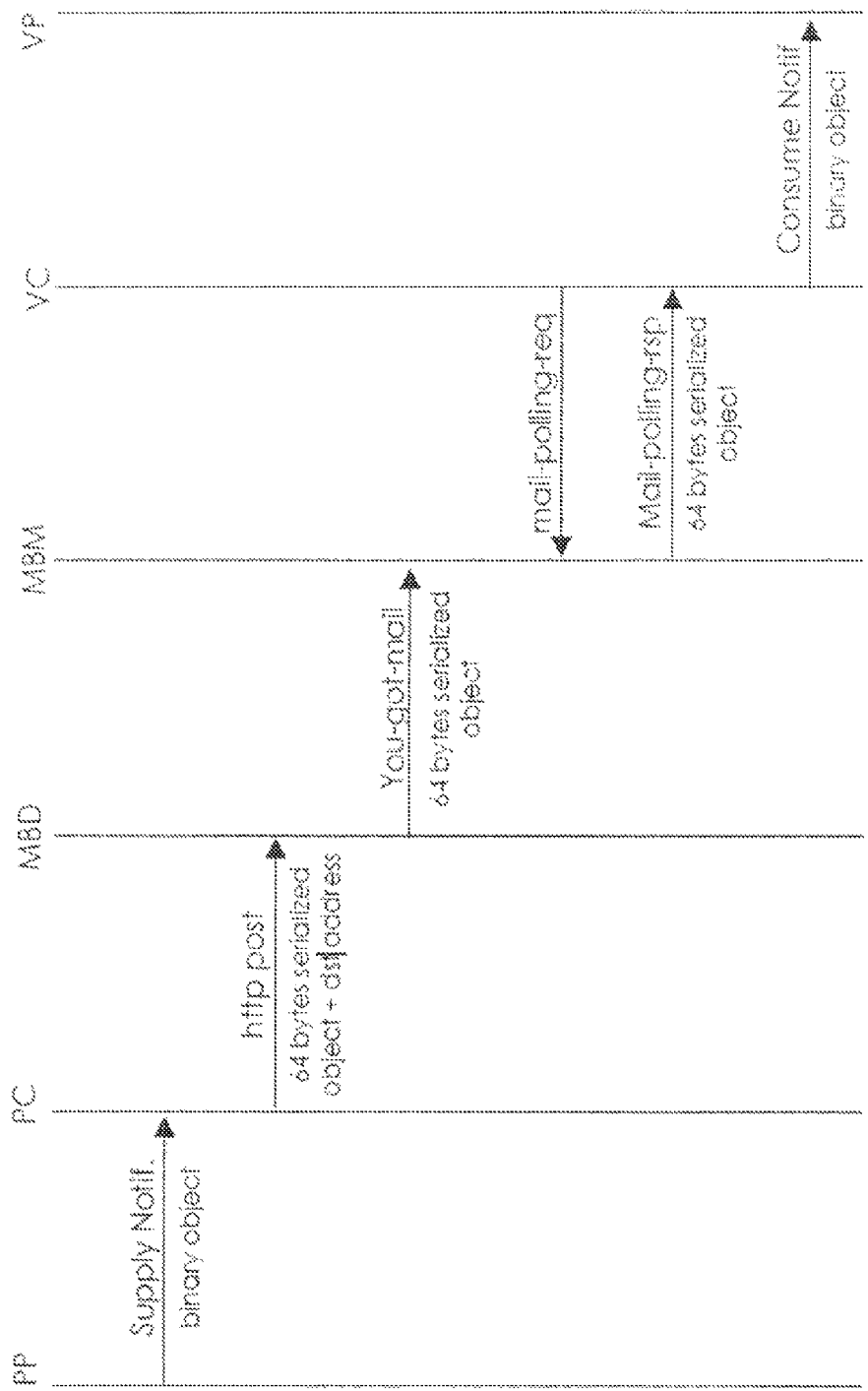
FIG. 11 – Object synchronization flowchart

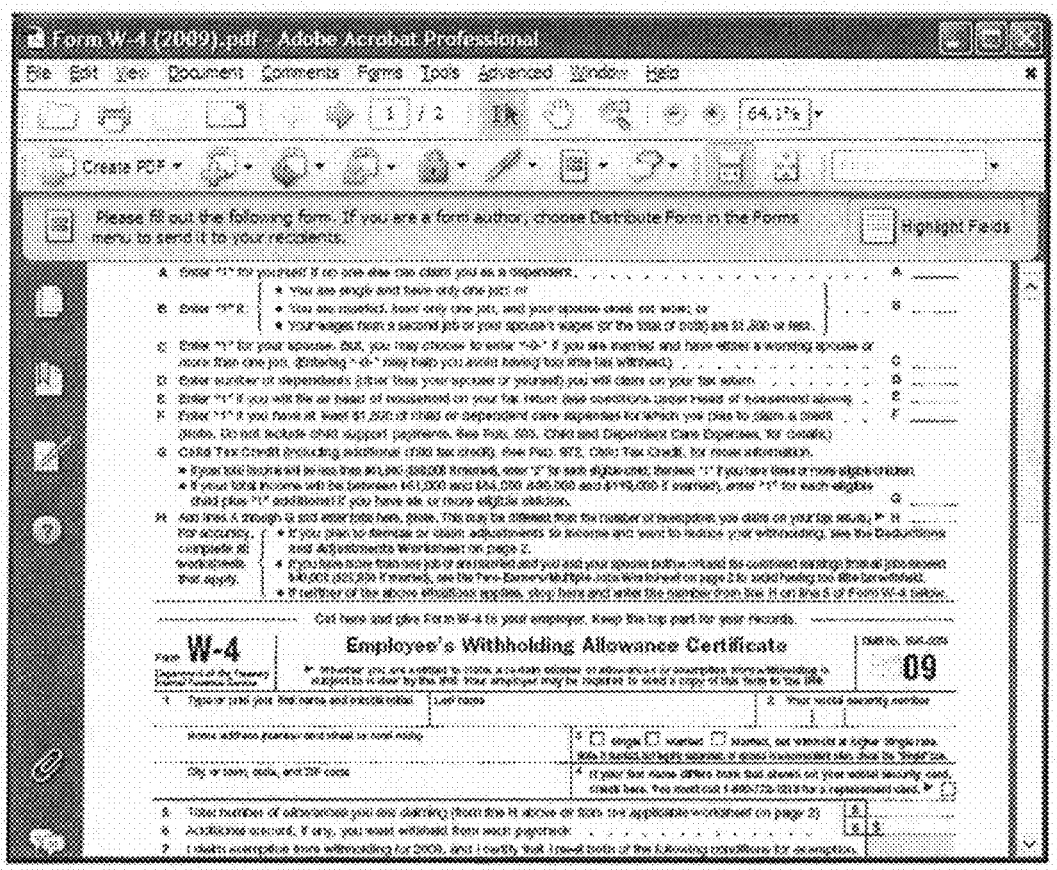
FIG. 12A – Form

FIG. 12C

Sign here (type your name): _____
☐ By clicking the checkbox you are agreeing to use an electronic signature, which means:
    1. You agree to use an electronic document and an electronic signature.
    2. You understand that electronic signatures are legally binding in the United States and other countries.

Your IP address:                          Date:

FIG. 14

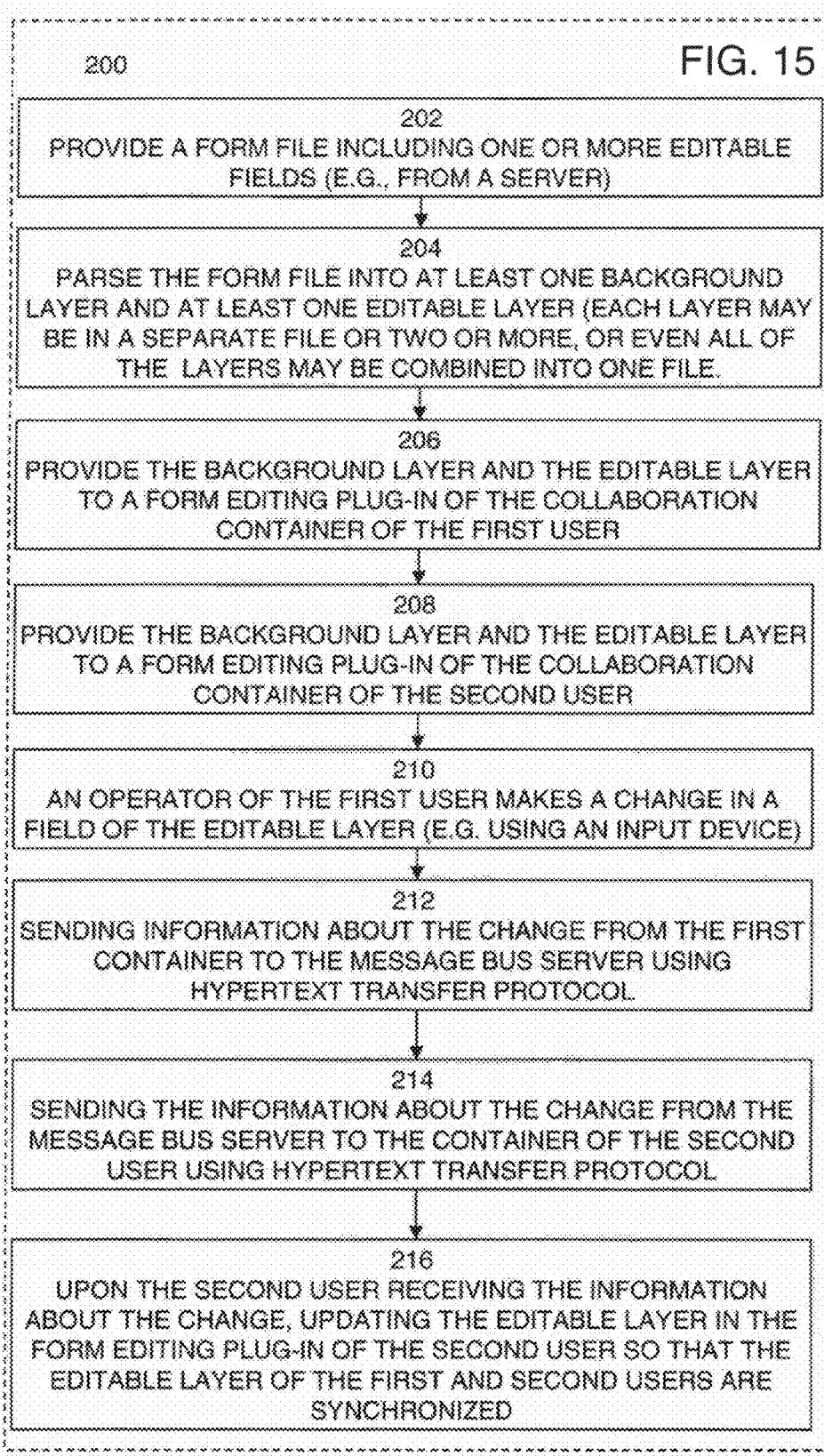

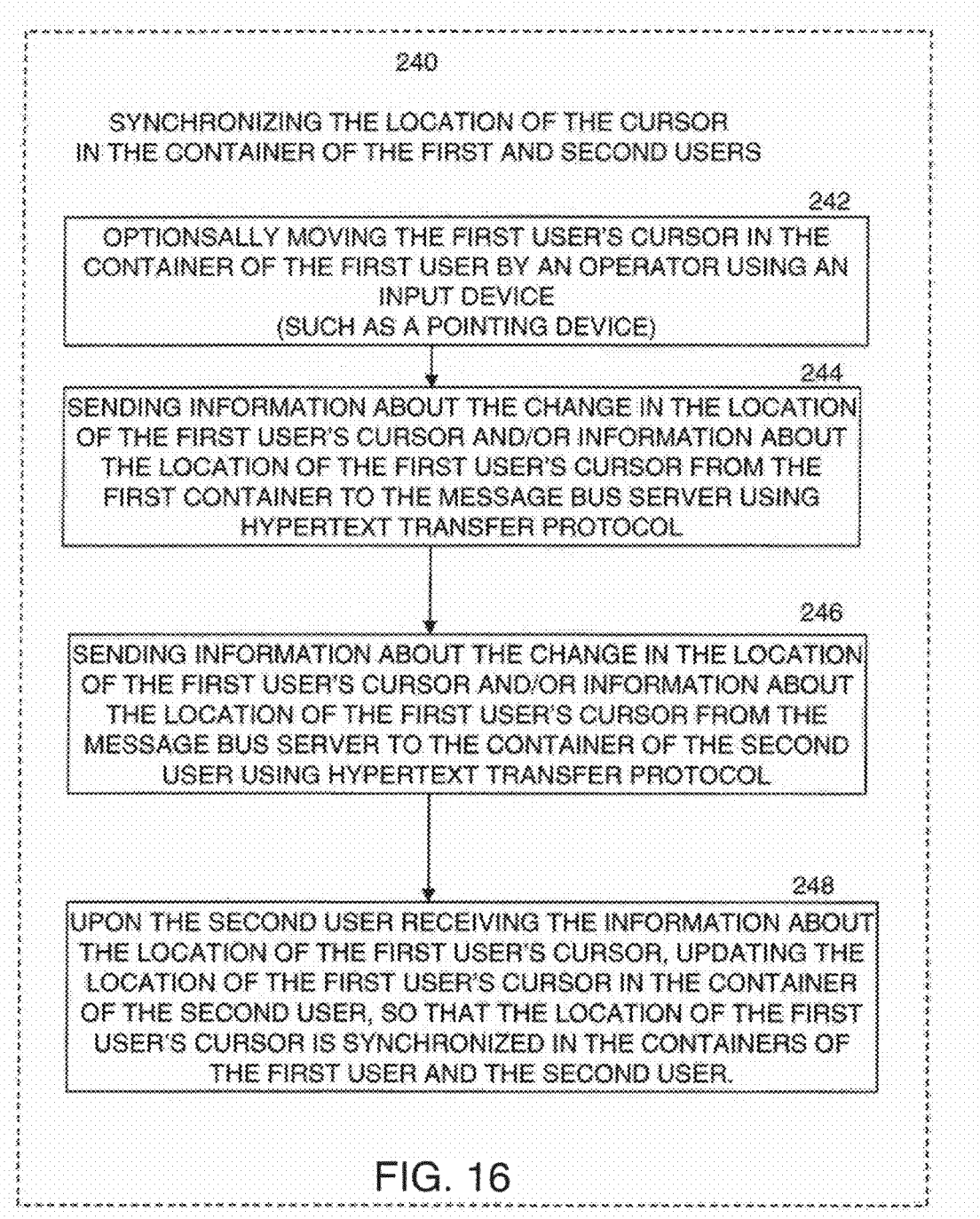

SYSTEM AND METHOD FOR SYNCHRONIZING COLLABORATIVE FORM FILLING

CLAIM OF PRIORITY

The present application claims the benefit of U.S. Provisional Patent Application No. 61/390,439 (filed on Oct. 6, 2010), hereby incorporated by reference in its entirety for all purposes.

FIELD OF THE INVENTION

The present invention relates to collaborative web applications. In particular, this invention relates to web applications that allow a plurality of users to collaborate in a synchronous manner for filling a document such as a form.

BACKGROUND OF THE INVENTION

There have been many advances in applications that have enabled groups of individuals to collaborate together even when separated by large distances, such as by sharing files, or chatting on the internet. Many of these advances are not synchronous and require sending documents back and forth. Others require installation of software, changes to network firewall settings, saving of files, or continuous links between users.

Examples of methods for collaborative web applications are described in PCT Application No. WO2008/102364, published on Aug. 28, 2008 (Moed et al.), U.S. Patent Application Publication No. 2001/0037367A1, published on Nov. 1, 2001 (S. Iyer), U.S. Patent Application No. US 2006/0053380A1, published on Mar. 8, 2006 (Spataro et al.), and U.S. Patent Application No. US 2004/0243672A1, published on Dec. 2, 2008 (Markki et al.), all expressly incorporated herein by reference in their entirety.

In some applications, the use of a collaborative web application has been limited or nonexistent. For example, in filling of forms by a user, the opportunities for collaboratively filling the form are limited and/or require installation of software or changes to a network firewall setting. Without collaboration, providers of a form face the challenge of having the form fillers accurately and efficiently fill in the form. Additionally, the permissibility of electronic or digital signatures is increasing and may require extra diligence when filling out a form.

There continues to be a need for collaborative web applications that allow for synchronous collaboration by a broad range of users having different firewall and security settings, and having poor to excellent network stability. For example, there is a need for a collaboration method that does not require installation of software (e.g., having an executable file), that does not require specific firewall settings, that does not require HTTP tunneling, that does not require a continuous link, that can work on an unstable network, that does not require a large bandwidth, that allows for synchronizing documents in two or more computers, that does not require transmission control protocol (i.e., TCP), or any combination thereof.

For example, there is a need for collaborative web form filling applications that allow for synchronous collaboration. It would be advantageous to have a system or method that enables effective collaborative form filling, so that remote verification (e.g., of the accuracy) of the form filling may be conducted.

SUMMARY OF THE INVENTION

One aspect of the invention is directed at a process for collaboratively filling a form by two or more users each having their own respective web browser and input device comprising: a) providing to each user access to at least one server system that includes i) at least one message bus server component; ii) at least one application server component; and iii) at least one plug-in server component; b) delivering a first container from the at least one application server component to a network browser of a first user; c) delivering a second container from the at least one server component to the network browser of one or more second users, wherein the first container and the second container are the same as or different from each other; d) receiving one or more requests from the first user for a first plug-in via the plug-in server component; e) delivering to the first container the first plug-in from the plug-in server component; f) notifying the second user of the one or more requests by delivering a notification through the message bus server component; g) delivering to the second user via the plug-in server component a plug-in compatible with the plug-in of the first user, so that the first and second user are each substantially simultaneously able to access compatible plug-ins and operate the plug-in in a coordinated substantially synchronized manner for modifying and/or observing a common file associated with the plug-ins; h) selecting a form to collaboratively fill by a form selector, wherein the form selector is one of the first or second users; i) sending the selected form to the application server component, or sending a request for the form to the application server component whereupon the application server component retrieves the selected form, wherein the selected form is a collaborative form or a form that is not a collaborative form; j) converting any selected form that is not already a collaborative form into a collaborative form; k) delivering the collaborative form to the plug-in of the form selector, wherein the collaborative form has one or more editable fields; l) delivering the collaborative form to the plug-in of the other user; m) following one or more modifications of the collaborative form made by the first user, communicating to one or more of the other users, the one or more modifications, wherein the communicating is substantially contemporaneously with the modification, wherein the communicating takes place by i) serializing the modification to string using in the container of the first user and sending the string using HTTP; ii) posting the serialized string to the message bus server; iii) cloning the serialized string for sending to the second users; iv) de-serializing the string to the modification in the container of the second user; and v) consuming the modification by the plug-in of the second user; wherein the collaborative form is the common file; so that the modification is delivered to the second user without interference by a firewall.

This aspect of the invention may be further characterized by one or any combination of the following features: the process may includes a step of creating or providing the selected form, the selected form is not a collaborative form and includes one or more editable fields, and a background; the process includes the step of converting the selected form into a collaborative form; the collaborative form has an image component and an editable component, the image component includes the background of the selected form and is in a vector format data file, the editable component includes the one or more editable fields of the selected form and is in a textual format data file; the step of converting the selected form includes a step of converting the form into a vector format data file, and then parsing form to create the textual format data file that includes field positions and types; the step of sending the background of the form and the one or more editable fields to the first user container and the second user container does not employ a continuous TCP connection; the process includes a step of selecting the first plug-in by the first user, prior to the step of delivering the first plug-in to the first container; the process includes one or more steps of adding, modifying, or deleting an editable field of the collaborative form in a plug-in; the process includes one or more steps of modifying an editable field of the collaborative form by the second user, and following any modifications of the collaborative form common file made by the second user, communicating to one or more of the other users, the one or more modifications, wherein the communicating is substantially contemporaneously with the modification, wherein the communicating takes place by i) serializing the modification to a string in the container of the second user and sending the string using HTTP, ii) posting the serialized string to the message bus server, iii) cloning the serialized string for sending to the other users, iv) de-serializing the string to the modification in the container of the other users, and v) consuming the modification by the plug-in of the other users; the collaborative form includes one or more selection boxes; the collaborative from includes one or more fields or boxes capable of storing a digital signature; the process includes a step of digitally signing the collaborative form by the first user, the second user, or both; the process includes a step of one user inviting another user to join a collaborative session; the selected form is a contract or other agreement, an application, a document to be published or presented, a questionnaire or survey, a statement that requires verification, or any combination thereof; the process includes a step of storing the modifications, including any digital signatures to the collaborative form; the process includes a step of converting the collaborative form and the modifications into a pdf file; the process includes a step of storing to the application server component the modifications, including any digital signatures to the collaborative form; the process does not employ a continuous link between the second user and the message bus server component; the users are each independently a computer, a mobile phone, a personal digital assistant, or an electronic tablet; the first container is different from the second container; the message bus server component implements a supplier/consumer notification service; the process includes the steps of: a) upon receiving a second modification of the common file via an input device of the second user, delivering from the second container to the message bus server component, a notification including a characterization of the second modification of the common file, b) delivering the notification of the second modification or a variation thereof from the message bus server component to the first container, and c) updating the common file of the first container so that the common file in the plug-in of the first user and the common file in the plug-in of the second user are synchronized; the process includes the step(s) of: (i) storing a file including one or more modification of the common file, or information about the one or more modification of the common file, (ii) printing a document including one or more modifications of the common file, or (iii) both (i) and (ii); the method includes synchronizing the common file of more than two users using the message bus server component; the process does not employ HTTP tunneling between the message bus server component and the second user; the first container is an ActionScript application; the first modification of the common file includes one or more characters; the second modification of the common file includes one or more characters; the input device of the first user includes a keyboard, a mouse, a microphone, a touchpad, or a joystick; the process includes the steps of: (a) sending a plurality of messages from a user to the message bus server component, wherein adjacent messages are spaced by a predetermined time interval, (b) sending a plurality of messages from the message bus server component to a user, wherein adjacent messages are spaced by a predetermined time interval, (c) or both (a) and (b); the plug-in is sent to a network layer of the first user using an HTTP protocol; the modification to the common file is a complex object; the message bus server component does not stream the messages; the process does not employ a continuous link between the second user and the message bus server component; the process does not employ a constant transmission control protocol (TOP) connection between the message bus server component and the second user; the process does not employ a constant TCP connection between the message bus server component and the second user; the first user and the second user both include a display unit, and the process includes synchronizing the appearance of a window on the display units; the first user includes a storage device, and the process includes the steps of sending an object from the second user to the first user via the message bus server component, and saving a file to the storage device, wherein the file includes the object; the first container includes a network layer and an application programming interface (API) for plug-ins, and the plug-in includes a notification supplier element and a consume element, wherein the process includes: passing an object from the notification supplier element of the plug-in to the API of the first container, passing the object to the network layer of the first container, and passing the object to the message bus server component; the message bus server component includes a message bus dispatcher and a message bus mailbox module; a second user is established by receiving a web address for the application server component by the second user, and the second user connecting to the application server component in the web browser of the second user; the process includes the steps of uploading a document to the application server component, converting the document to a flash format, and sending the flash format of the document to the first and second users; the process is free of a step of saving an executable file in the non-volatile memory of the second user; the process includes one or more steps of adding, modifying, or deleting an editable field during a collaboration session; or the step of sending the background of the form and the one or more editable fields to the first user container and the second user container employs periodic HTTP requests and is free of a continuous TCP connection.

Another aspect of the invention is directed at a file or document prepared by the process described herein, wherein the file or document is electronically stored, printed, graphically displayed, or any combination thereof.

Another aspect of the invention is directed at a system for synchronizing collaborative web applications by a first user and a second users using a collaborative infrastructure including: a data communication network; a message bus server component coupled to the data communication network; an application server component coupled to the data communication network; a plug-in server component coupled to the data communication network; a first user having a network browser and coupled to the data communication network; a second user having a network browser and coupled to the data communication network; and a common file, wherein the common file is a collaborative form; wherein the application server component is configured for i) delivering a first container to the network browser of a first user, and ii) delivering a second container to a second user; wherein the plug-in server component is configured for i) delivering a plug-in to the container of the first user upon receiving a request for the plug-in from the first user; and ii) delivering a plug-in to the container of the second user upon receiving a request for the plug-in from the second user; wherein the first container is configured for converting modifications to a common file of the plug-in to a serialized string using HTTP for notifying the second user of the modification to the common file; and wherein the message bus server component is configured for delivering the notifications to the second user; so that the second user can synchronize the common file with the first user.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting.

FIG. 2 is an illustrative flow chart of process steps that may be employed in synchronized collaboration of an application.

FIG. 9 is an illustrative example of a schematic container structure chart.

FIG. 11 is a flowchart illustrating an example of an object synchronization process during a synchronized collaboration application.

FIG. 12A is an illustrative form that may be selected, prepared or otherwise provided for collaborative form filling. Without limitation, the form may be a PDF format fillable form.

FIG. 12C is an illustrative background image of the non-editable portion of the FIG. 12A. The background image preferably is converted to a vector format, such as SWF.

FIG. 14 is an illustrative signature box that may be included or added to a collaborative form. The signature box may include one or more editable signature fields, one or more check boxes, a date and time stamp box, an IP address stamp box, or any combination thereof.

Figure 1A:
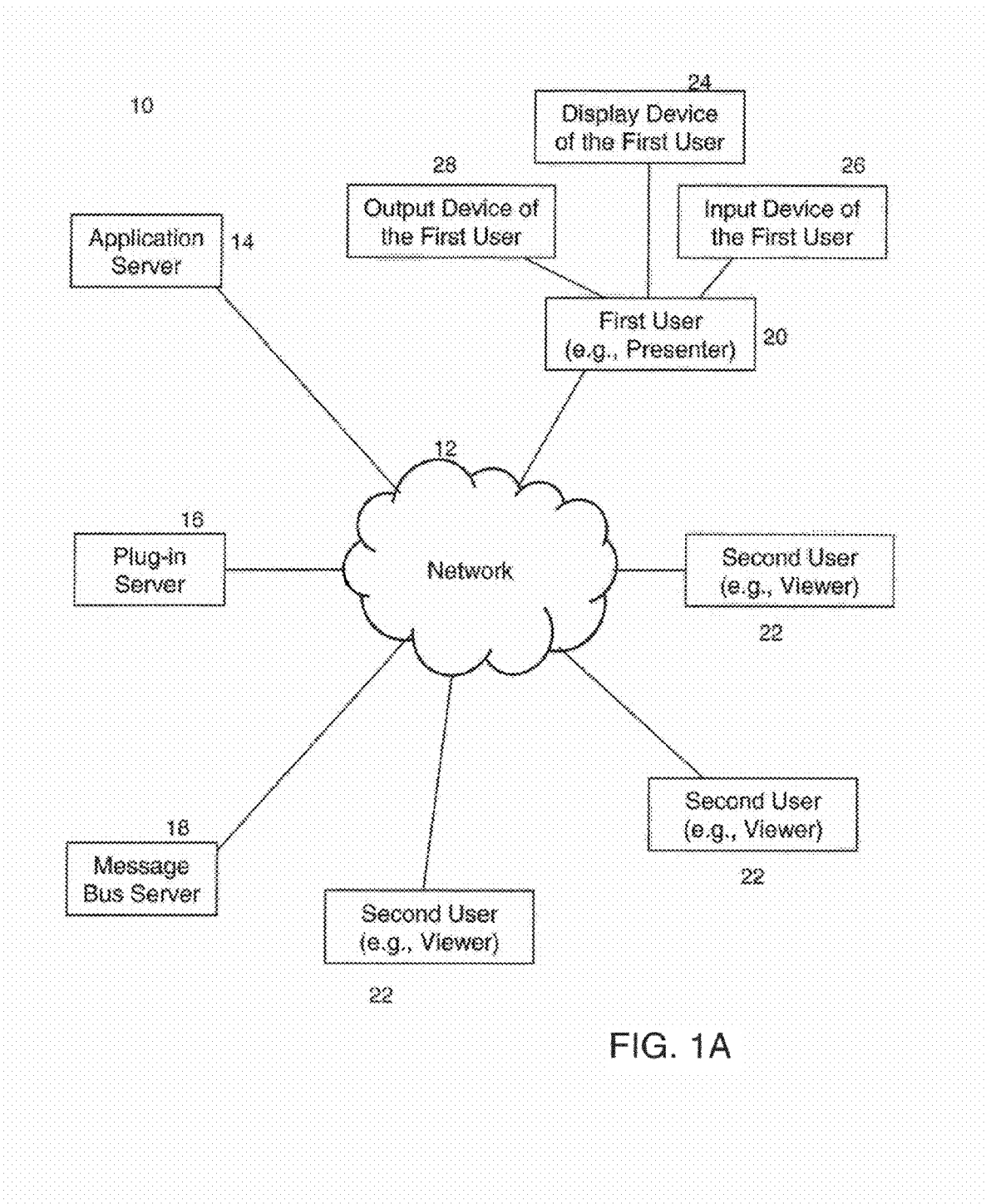
FIG. 1A is a schematic diagram illustrating features of a system for synchronized collaboration of an application.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

FIG. 15 is a flow chart illustrating steps that may be employed in a process for collaborative form filling.

FIG. 16 is a flow charts illustrating steps that may be employed so that the movements of the cursor in the plug-in of one user may be updated in the plug-in of another user in a substantially simultaneously fashion.

DETAILED DESCRIPTION OF THE INVENTION

The following description is presented to enable one of ordinary skill in the art to make and use the invention as provided in the context of one or more particular applications and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. For example, one or more of the steps described in the methods of the invention may be eliminated and/or replaced. In other instances, well-known methods, procedures, and components have not been described in detail, so as not to obscure the present invention.

System and methods of the present invention provide novel means of synchronizing collaborative web applications and related features. The architecture of the system and the process of the collaboration methods allow for synchronized collaboration between a plurality of users without the need for installing software (e.g., without the need for saving an executable file in the non-volatile memory of the users), without the need for specific firewall settings, without the need for a large bandwidth (e.g., for sending outgoing messages), without a continuous link (for example between a container and a server, such as the message bus server) or any combination thereof. Thus, the teachings contemplate a system, software, apparatus, and process that is free of a continuous link, that is free of HTTP tunneling, that is free of Transmission Control Protocol (i.e., TCP) between a container and the message bus server, that is free of a step of installing software in a manner that changes an registry and/or saves a file to non-volatile memory, or any combination thereof.

As used herein, a container is a main application that runs in a network browser. The container may contain one or more other applications, one or more plug-ins. The container may additionally control the flow of messages or other information to an application or plug-in that is in the container.

In one aspect of the invention, the collaborative network application includes or consists essentially of filling a form or other document. Preferred forms and documents are those that can benefit from the collaborative form-filling by two or more remote users. Without limitation, the collaborative form filling may be employed for filling an application (such as an employment application, a membership application, a loan application, a rental application, a school application, an award or scholarship application, and the like), a contract or other agreement (such as a purchase agreement, a work agreement, a trade agreement, a rental agreement, a license agreement, and the like), a questionnaire or survey, and the like. Other documents which may benefit from collaborative form filling include documents for a publication or presentation, letters, business and/or legal documents, and statements. Particularly advantageous use of the collaborative form filling include applications that require a signature or other verification. For example, the process of collaboratively filling a form may include a step of verifying the user identify, electronically stamping (e.g., capturing and/or recording) a time and/or date, signing the form electronically, electronically stamping (e.g., capturing and/or recording) an IP address, or any combination thereof.

The present invention may employ one or any combination of the features (such as process steps and/or system components) described in U.S. Provisional Patent Application No. 61/166,768 (filed on Apr. 5, 2009), and PCT Patent Application No. PCT/US10/29819 (filed on Apr. 2, 2010), both of which are hereby incorporated by reference in their entirety for all purposes.

The present invention, advantageously may employ simple HTTP interactions in which a continuous connection (e.g., between a user and a server) is not needed. This makes the present invention particularly suitable for use with wireless networks (e.g., Wi-Fi networks) which tend to have short drop-downs. Such drop-downs may prevent the use of collaboration methods that require a continuous connection.

Advantageously, the systems and methods of the present invention may employ HTTP protocol for synchronizing one or more collaborative web applications in two or more users.

The present invention makes advantageous use of unique and elegantly simple methodology that allows for multiple users to substantially contemporaneously access a common file, and modify, navigate or otherwise observe the file at remote locations from one another. By way of example, substantially in real time, two or more users can collaboratively word process and temporarily and/or permanently modify, navigate, or otherwise observe one or more files. For example, the technology herein is particularly attractive in that the system architecture operates in a way that avoids the need for and may be substantially free of any requirements for users to download specific collaboration software, for users to adjust firewall settings, for users to have access to a network with a high bandwidth for uploading, for users to have access to a stable network, for users to create a continuous link (e.g., with a message bus server), or any combination thereof. It has been realized through the teachings herein that collaboration is possible for mass scale use by users having a wide variety of hardware and software by virtue of a unique approach to data management that involves serialization of data in a manner that is can be transmitted between users (e.g., via one or more servers). Serialization may be performed by suitable software that functions to convert an object into a string using Hypertext Transfer Protocol (HTTP).

The system and methods described herein may be employed in a broad range of collaborative web applications. Without limitation, the collaborative web applications which may take advantage of the present invention include co-browsing, working together on documents, viewing a map together, conducting a sales or marketing session, filling in a form together, shared text editing, shared viewing of still or video images, live presentations, viewing 3D models together, collaborative shopping, shared drawing of documents, shared operation of calculators, shared technical or financial analysis, shared educational testing or review of educational information or tests, or any combination thereof. For example, the present invention may enable synchronized co-browsing between multiple web browser clients (i.e., users), using collaborative web applications, the teachings thus contemplate collaboratively accessing, modifying, navigating, or otherwise observing one or more file or other item for word processing, browsing the internet, spreadsheet calculating, database sorting, image viewing, form filling, and the like.

Network Environment

Referring to the drawings, FIG. 1A illustrates an exemplary network environment in which the present invention may be utilized. Although FIG. 1A illustrates a network environment 10 with a plurality of users (e.g., a first user and three second users), it will be appreciated that the invention is operable with any number of users. Users herein generally contemplate a computer device. In FIG. 1A, a plurality of users including a first user 20, and one or more second users 22 are coupled to a data communication network 12. The data communication may be any network capable of connecting the users (e.g., via electronic signaling, radio frequency signaling, or otherwise). A preferred data communication network is a network that includes or consists essentially of the internet (i.e., the network supporting the World Wide Web). The network environment 10 may include one or more computer servers. For example, the network environment may include a server system that includes an application server component 14, a plug-in server component 16, and a message bus server component 18. A user may be connected to a display device 24, an input device 26, an output device 28, or any combination thereof. The application server 14 may be employed to host and/or deliver a synchronization framework to the first user 20, to the one or more second users 22, or preferably both. The plug-in server 16 may be employed to host and/or deliver one or more plug-ins to the first user 20, to the one or more second users 22, or preferably both. The message bus server 18 may be employed for synchronizing one or more plug-ins of the first user 20 and one or more second user 22, or preferably of the first user 20 and all of the second users 22.

It will be appreciated that a single server may perform the functions of two or more of the message bus server, the application server, and the plug-in server. For example, the system may include a single server that includes the message bus server component, the application server component, and the plug-in server component. It is further contemplated that two or more of the server components can be distributed among two or more servers.

Figure 1B:
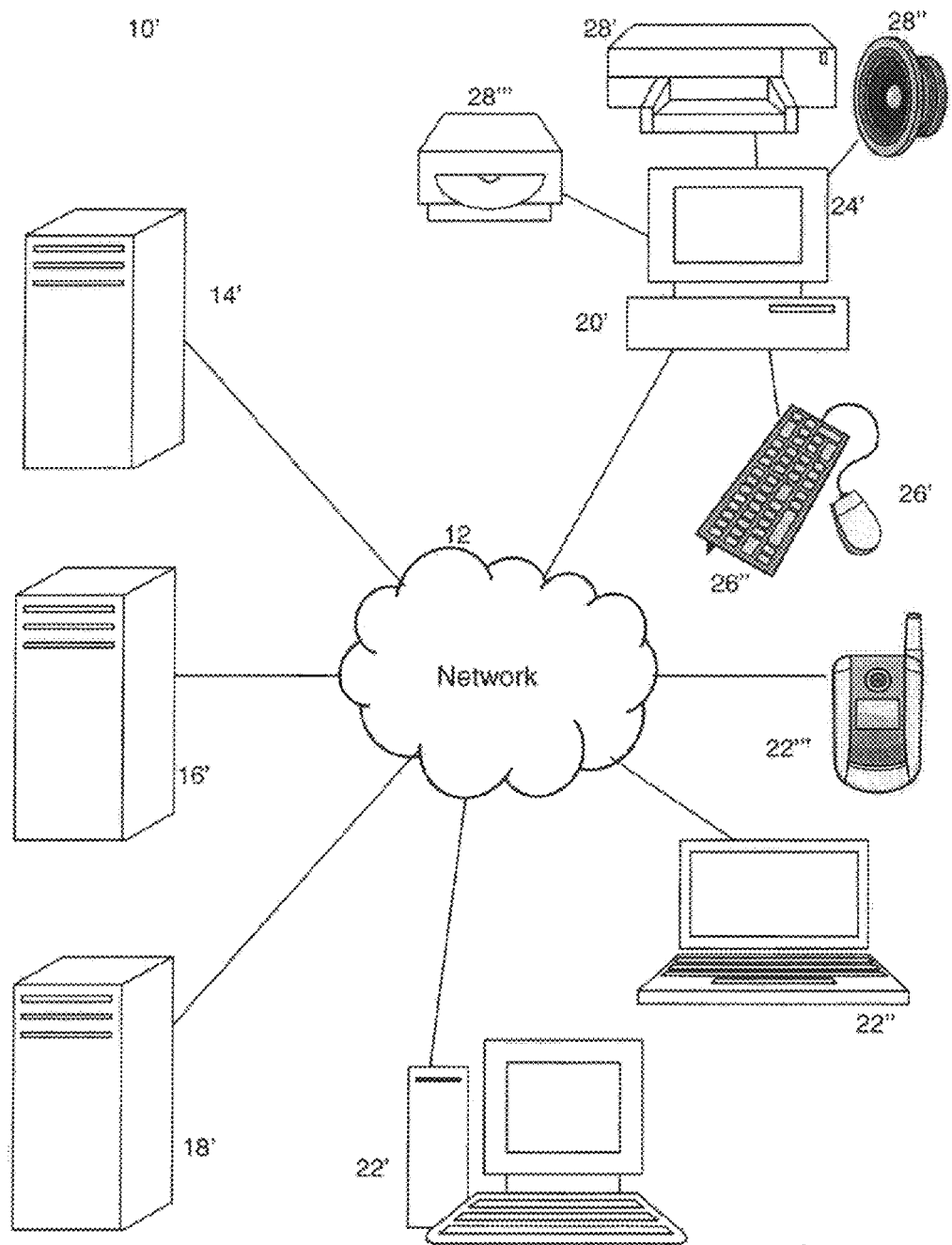
FIG. 1B is a schematic diagram illustrating features of a system for synchronized collaboration of an application.
Figure 7:
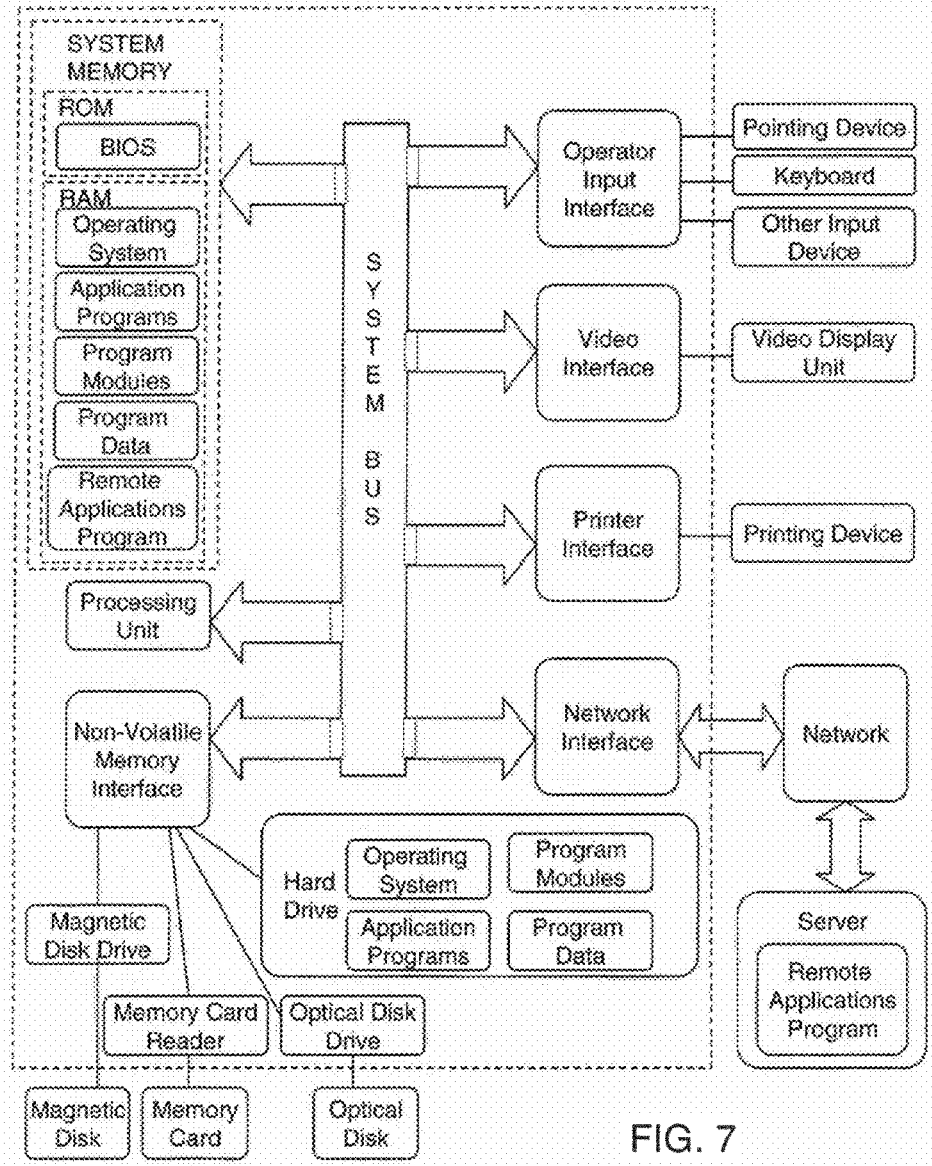
FIG. 7 is an illustrative diagram of features that may be employed in a networking device such as a computer.

With reference to FIG. 1B, it will be appreciated that the first user and the one or more second users may be any device capable of receiving the synchronization framework, communicating with the message bus server, or preferably both. By way of example, the one or more users may individually and separately each be a computer (such as a desktop computer 22', 20', or a laptop computer 22"), a mobile phone 22''', a personal digital assistant, or an electronic tablet. The input device may be any device capable of being manipulated by an operator of the user for inputting an object into a plug-in. By way of example, the inputting device may be a keyboard 26", a pointing device 26', a microphone, and the like, or any combination thereof. The output device may include a memory storage device 28''' (such as an optical disk reader/writer, a magnetic disk reader/writer, or a memory card reader/writer), a printer 28', a speaker 28", and the like, or any combination thereof. The user may be a device, such as a computer, having one or any combination of the features illustrated in FIG. 7.

Embodiments of the present invention enable synchronized co-browsing between multiple web browser clients, using collaborative web applications.

The term "web applications" as used herein may encompass plug-ins, add ons, consoles, applications, programs, or additional software that is required to execute a transaction or function via a web browser.

The deployment architecture of the synchronized collaboration system (e.g., the synchronized co-browsing system) may be based upon a plug-in model, wherein applications plug-in to the synchronization framework. The applications may include public applications, custom-made applications, tailored applications or any combination thereof.

The deployment architecture of the synchronized collaboration system (e.g., the co-browsing system) may be based upon a synchronization framework that utilizes or implements, at least partially, a supplier/consumer model notification service. By way of example an exemplary supplier/consumer model notification service that may be employed is a Common Object Request Broker Architecture (i.e., CORBA) Notification Service. Other notification services. Preferably, the notification service may be used to provide an architecture where each side or user implements, a notification supplier element (e.g., for supply events) and a notification consumer element (e.g., for consume events). The remaining framework may provide a "channel" that takes care of distributing the events in a way that is transparent to the modules (e.g., plug-ins) which communicate through it. In one example, the work flow can be summarized as:

Supplier (Push)→Channel→Consumer (pull).

Figure 8:
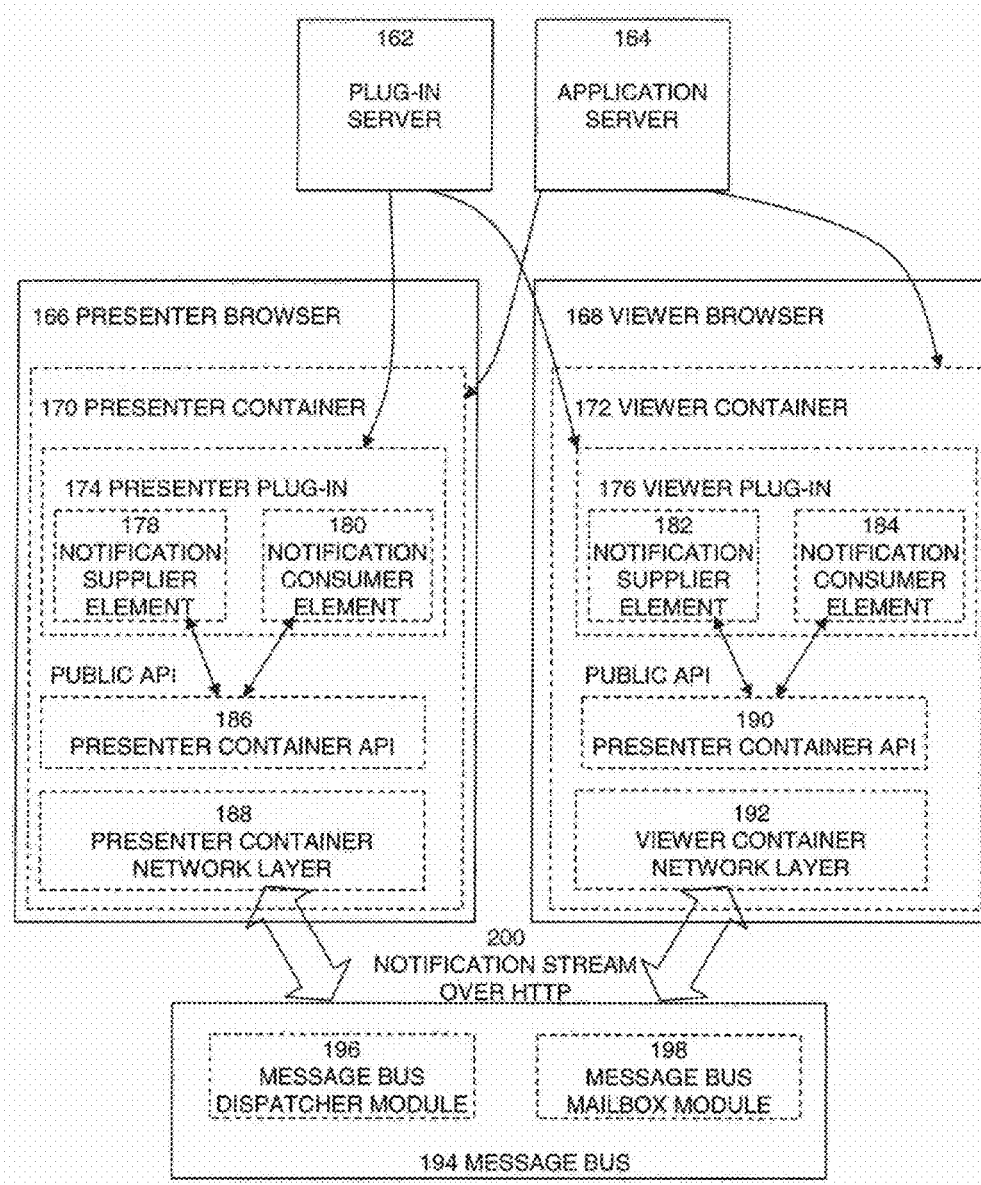
FIG. 8 is a schematic block diagram of a synchronized collaboration system illustrating features of the synchronization infrastructure.

Reference is now made to FIG. 8, which is a schematic block diagram illustration of an exemplary system for synchronizing collaborative web applications that may be used in the present invention. As can be seen in FIG. 8, the system may include an application server 162, a plug-in server 164, a message bus server 194, and a plug-in application infrastructure functioning on multiple client devices. The application server 162 may serve or deliver application infrastructures to clients (i.e., to users). The application infrastructure on a client are hereinafter referred to as containers. For example, a container may serve as the "container" application for both the first user (e.g., presenters) and the one or more second users (e.g., the viewers). As another example, the container for the first user may be different than the container for the second user. Preferably, the container for the first user has one or more functionalities that is not in the container for the second user. By way of example, the first container may include functionality to invite operators to join a collaborative session, to allocate an editing control to one or more other users, to remove a user from a collaborative session, to reallocate an editing control away from a user, or any combination thereof. The viewers may be an audience to the presenter. It will be appreciated that the first user may switch roles with another user so that a second user is a presenter and the first user is a viewer. The container may be remotely stored on the application server. For example, the container may be a scripting language file or application, such as an AS3 (ActionScript 3) application, or other suitable application, that may be loaded from the application server to the presenter browser 166 and viewer browser 168, to provide a framework or container for the synchronized application to each user. Of course, other structures, elements or components may be used. Preferably, during a collaboration session, the container resides in the volatile memory of a user, and there is no need to store the file or application (e.g., the Action Script 3 file or application) in the non-volatile memory of user, before the session, during the session, or any combination thereof. Preferably, a user does not need to store the container file or application before, during and after the collaboration session.

The presenter container 170 in the presenter browser 166, may include a presenter container application programming interface (API) 186 and a network layer 188. The viewer container 172 in the viewer browser 168, may include a viewer container application programming interface (API) 190 and a network layer 192.

The plug-in server may be used to configure and supply plug-ins to users. For example, the plug-in server may be any web server that hosts a plug-in. The plug-in may be an "executable" application. For example, the plug-in may be coupled with an XML "descriptor", where the descriptor includes information on how the plug-in is used. Without limitation, the descriptor may include information such as what is the text in the menu that describes it, and what parameters it requires from the container to work properly. A plug-in may be a public plug-in. Alternatively, a user may write his or her own plug-in, place it on a server and use it in the session. Such plug-ins may be custom made (tailor made) applications. Some or all of the plug-in architecture may be from a set of documented public APIs, which the users/customers of the system can use to develop their own collaborative applications as plug-ins. It will be appreciated that a user may develop a plug-in that may interact with their servers and databases etc., place a plug-ins on their servers, use a plug-in in a collaborative session (e.g., with a customer), or any combination thereof.

During a collaboration session, the container may act as a host to one or more plug-in applications. The container may provide the one or more plug-in applications with a channel of communication that allows the plug-ins to communicate with remote instances (e.g., one or more or all of the other users). The communication with remote instances may be as if they were running on the same computer. The communication with another user may be by a simple method invocation. For example, the plug-in may interact with the container using two functions. The first function is a supply notification which may pass an object to the container so that the container may distribute it (e.g., via the message bus server) to all other instances of the plug-in that run on the other users. By way of example, an operator of the presenter may make a change to a plug-in using an input device, the plug-in may capture the change as an object and pass the object to the container so that it can be packaged and sent to the viewers. The second function is a consume notification which may be invoked by the receiving end container. The consume notification may function by passing a "clone" of the object that was sent. For example, a second user (e.g., a viewer) may pass a clone of an object sent by a first user (e.g., a presenter) to the plug-in in the container of the second user, so that the plug-in of the first user and the second user are synchronized. It will be appreciated that an object may be any object. For example the object may be an object of a complex structure. Without limitation, the object may be a vector, a text, a size, a color, a sound, a direction, a line, a combination of many lines, a width, a location (such as a position of a cursor or pointing device), or any combination thereof.

The container may provide one or more session-level collaboration functionalities. Any session-level collaboration functionality may be provided. By way of example, session-level collaboration functionality that may be provided include: showing the mouse location of one or more, or even all users; enabling textual chat; loading/unloading plug-ins (add/close tabs); providing a handing-over-control mechanism, whereby the presenter can give any viewer the ability to act as the presenter role, including adding new plug-ins or acting as presenter in plug-ins; sending usage statistics to the application server, informing the various plug-ins about status or changes in life-cycle events, and the like, or any combination thereof. Examples of status or changes in life-cycle events that may be provided between collaborators include, when a plug-in is active, in-focus, out-of-focus, terminated, and the like. By way of example, usage statistics that may be sent to the application server include how many participants used the plug-ins, for how long the plug-ins are used, and the geographical location of one or more user.

It will be appreciated that the container may host any number of plug-ins. For example, the container may host one plug, the container may host more than one plug-in, the number of plug-ins that the container hosts may change over time, or any combination thereof.

The container may provide a supplier/consumer model notification service, such as a plug-in application that "supplies" a notification object in the browser of one user and consumes it in the browser of a different user. The container may further provide the mouse location of one or more, or even all of the participants (i.e., all of the users. For example, the mouse location of the presenter or first user may be shown in the containers of all of the other participants. The container may provide a Toolbox that includes one or more tools or functions for collaborative or co-browsing. Exemplary toolbox tools include a pen, an eraser, a highlighter, a save function, a save to-pdf function, an undo function, a redo function, or any combination thereof, etc. The container may also provide a Tab mechanism that manages many plug-ins at the same time and "informs" the various plug-ins about status or changes in "life-cycle events", for example, when they are active, in-focus, out-of-focus, terminated etc. An example of a schematic container structure may be seen with reference to FIG. 9.

In general, the container may provide a plug-in API that allows the plug-ins to run in a synchronized mode on the web browser of two or more users (e.g., the presenter's and viewers' web-browsers). For example, the plug-in API may be a public plug-in API, such as a documented public API, written in AS3 that enables creation of a "synchronized application". It will be appreciated that other high-level programming languages that run inside a "player" plugin (as opposed to JavaScript that is run by the browser itself) may be used, such as Flash Player, Microsoft SilverLight and Java.

The message bus server (MB) is a web application that provides synchronization capabilities and routs messages from/to session users. Any protocol that provides synchronization capabilities may be employed. The MB may implement a publish-subscribe/mailbox architecture in random access memory (i.e., RAM). Access to the MB may be achieved using Hypertext Transfer Protocol (i.e., HTTP). Other protocols that provide synchronization capabilities and object synchronization functionality may be used, such as Remote Shared Objects using Real Time Messaging protocol (i.e., RTMP). Advantageously, according to the MB implementation using HTTP, firewall/NAT/proxy traversal is enabled. In contrast, typical usage of RTMP generally fails on many firewall/NAT/proxy configurations without specific configuration. Even when RTMP is "tunneled" through HTTP it generally fails since many firewalls that inspect the application layer will block it. As such, the processes and systems of the present invention preferably avoid using RTMP, tunneling HTTP, Transmission Control Protocol (i.e., TCP), or other protocols that may fail on firewall/NAT/proxy configurations without specific configuration.

FIG. 2 illustrates a process for synchronizing a plug-in in container of a first user and a plug-in in a container of a second user. The process may include a step of providing 31 a collaborative network application infrastructure. By way of example, this may include a step of delivering 32 the first container from the application server to the first user, and delivering the second container from the application server to the second user. The process may include a step of the first user (e.g., as accessed by the first operator) requesting 36 the first plug-in for the first container. The first user may also deliver 40 a first notification to the message bus server 42. The process may include a step of delivering 44 the first notification from the message bus server 42 to the second container. The process may include a step of the second container requesting 48 the second plug-in (e.g. to the plug-in server). The process may include a step of the first container receiving 38 the first plug-in (e.g., from the plug-in server) and a step of the second container receiving 48 the second plug-in (e.g., from the plug-in server), whereupon the first container and the second container are synchronized 49. The first plug-in and the second plug-in may be the same or different. Preferably the first plug-in and the second plug-in are compatible, so that the first and second user are each substantially simultaneously able to access compatible plug-ins and operate the plug-in in a coordinated substantially synchronized manner for modifying and/or observing a common file associated with the plug-ins. The process may include a step of a first operator inputting a change to the first plug-in using a first input device 50. The process may include a step of delivering a notification (e.g., a second notification) from the first container to the message bus server with information regarding the change to the first plug-in 52. The process may include a step of delivering the notification regarding the change to the first plug-in to the second container 56. The process may include a step of updating the second plug-in 58, so that the first plug-in (e.g., in the first container) 64 and the second plug-in (e.g., in of the second container) are synchronized 65.

Figure 4:
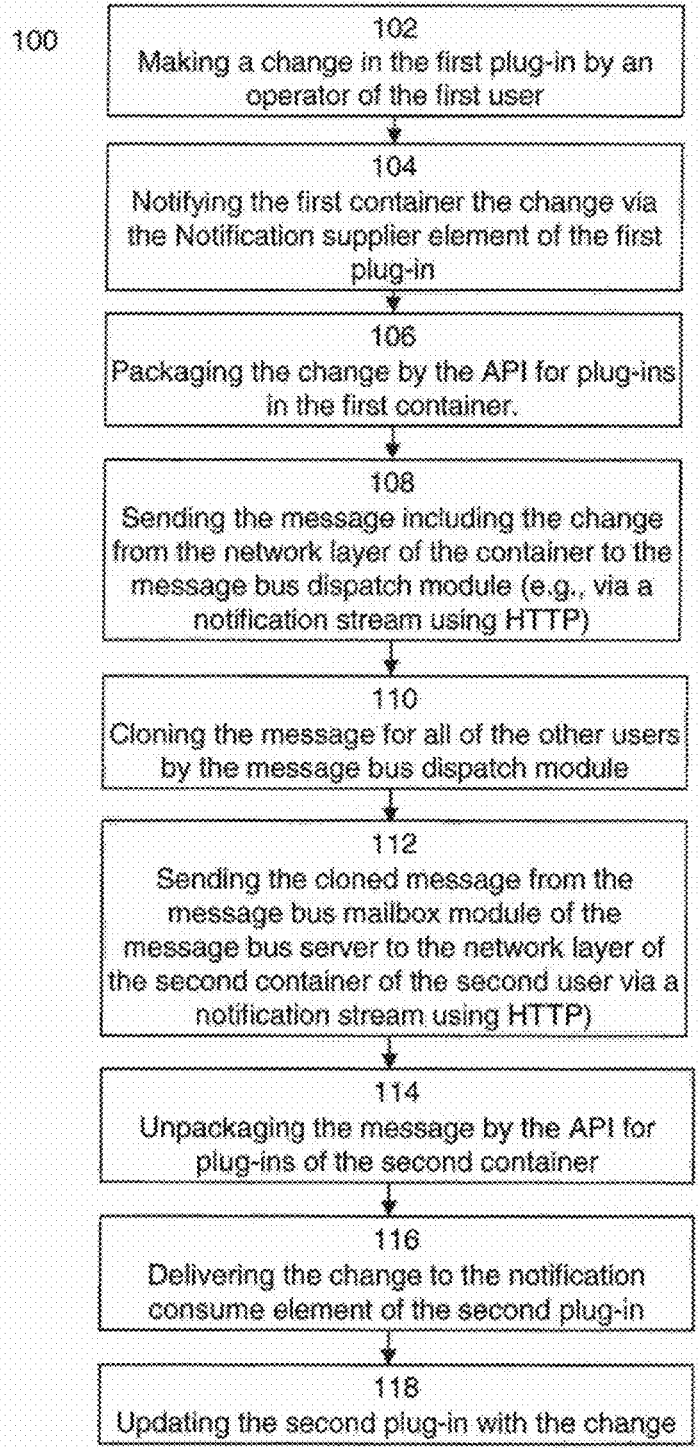
FIG. 4 is an illustrative flow chart of process steps that may be employed in synchronizing two users during a collaboration session using a message bus server.

With reference to FIG. 4, the process may include a step of synchronizing a plug-in in a first user with a plug-in in a second user after a modification is made (e.g., to a common file). The change may be made using an input device, such as by an operator of the first. The operator (e.g., an individual controlling the input device) of the first user may make a change or modification to a plug-in 102. The change or modification may be a change or modification to a common file (e.g., shared by the users) in the plug-in. The process may include a step of notifying the first container of the modification or change via the notification supplier element of the plug-in 104. The first container of the first user may then send the change or modification to the container of one or more other users, and preferably to all of the other users. The process of sending the change or modification (e.g., an object) may include a step of packaging the change by the API for plug-ins in the first container 106. After packaging, the change or modification, the into a message, the process may include a step of sending the message (which including the change) from the network layer of the container to a message bus dispatch module in the message bus server 108. This may be done using hypertext transmission protocol (i.e., HTTP). For example, the message may be sent via a notification stream using HTTP. The message bus server may forward the message by cloning the message for all of the other users. The cloning and/or the addressing of the cloned messages to the other users may be performed by a message bus dispatch module in the message bus server 110. The message bus server may also function by sending a cloned message (e.g., from the message bus mailbox module of the message bus server) to the network layer of the second container of a second user. The cloned message may be sent using HTTP 112. For example, the cloned message may be sent via a notification stream using HTTP. The by the API for plug-ins of the second container may at least partially function by unpackaging the message (e.g., the cloned message), to obtain the change or modification to the plug-in 114. The process may then include a step of delivering the change or modification (e.g., from the second container) to the notification consume element of the second plug-in 116. The process may then include a step of updating the plug-in with the change or modification 118 (e.g., updating the common file), so that the plug-in (e.g., the common file) is synchronized between the first user and the second user.

Further advantages of using HTTP, include the ability to synchronize plug-ins even when the a user has an unstable internet connection and the ability to synchronize plug-ins even when the bandwidth available by a user for uploading is generally low. For example, synchronizing may be accomplished even when the band width available for uploading is less than 20 kbytes/second, less than about 6 kbytes/second, or even less than about 3 kbytes/second. Of course, high band widths (i.e., greater than about 6 kbytes/second or even greater than about 20 kbytes/second may also be used. This contrasts with RTMP connections, which require significantly higher upstream bandwidth.

Collaborative functionality in web applications may be implemented by using a synchronized application. For example, the synchronized application may be a plug-in to the container that can be loaded from any web server. The synchronized application preferably provides collaboration functionality (e.g., working together on documents, viewing Google maps together, conducting 1-on-1 selling session, filling forms together, text editing together etc.). The "synchronized application" preferably interacts with the "Container" using the "Public plug-in API".

Figure 10:
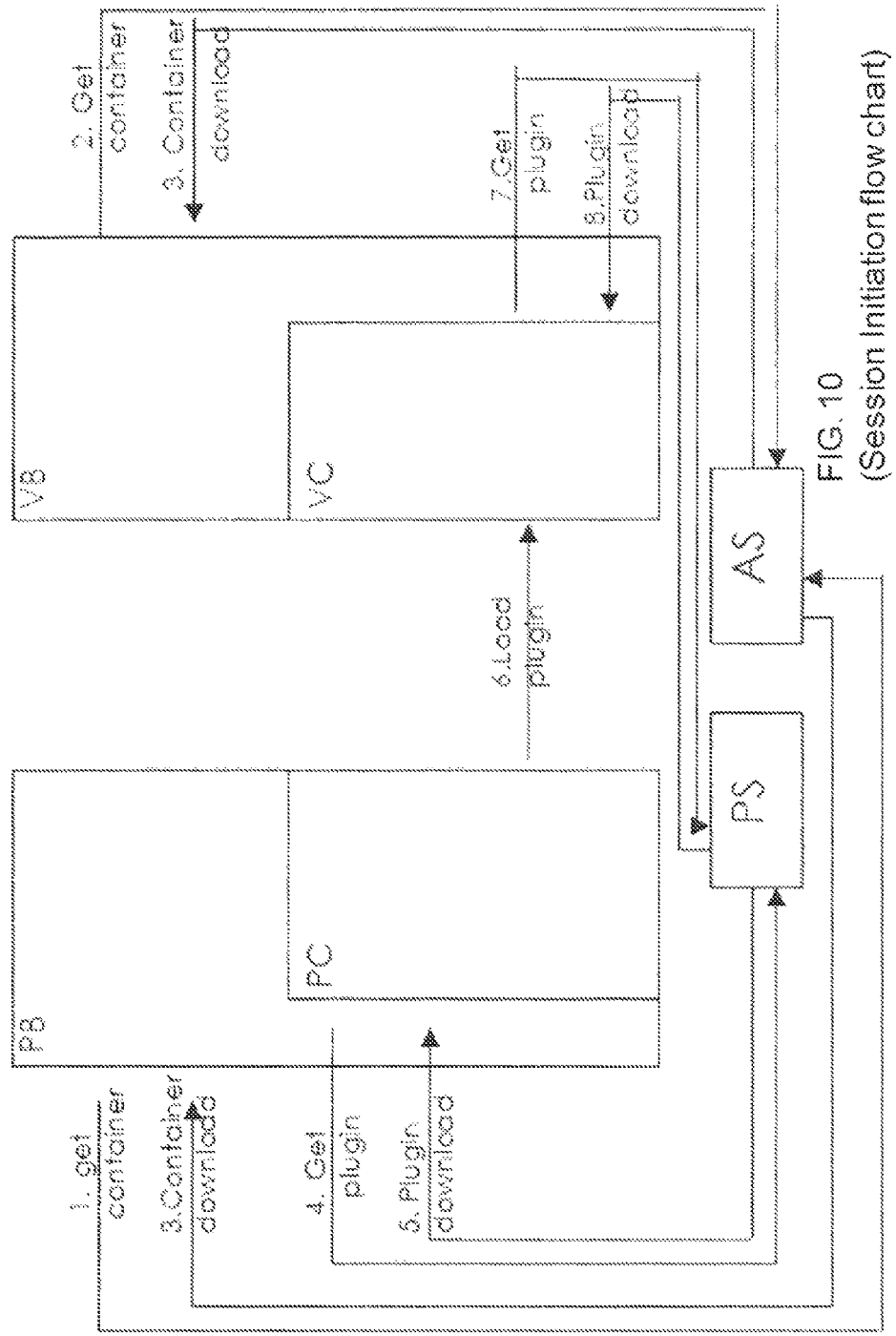
FIG. 10 is an illustrative flow chart of a session initiation.

FIG. 10 schematically illustrates a steps or processes that may be employed to enable synchronized collaboration (eg., co-browsing) between multiple web browser users. The process may include one or any combination of the following steps: the presenter browser (PB) requesting a container from the application server (AS); the viewer browser (VB) requesting a container from the AS; sending or downloading a container to the PB, the VB, or both; requesting by the presenter container (PC) a plug-in from the PS; receiving or downloading the plug-in from the PS by the PC; requesting by the viewer container (VC) a plug-in; the PC instructing the VC to load the plug-in; the viewer container (VC) requesting this plug-in from the PS; or the VC may receiving or downloading the plug-in from the PS.

As can be seen with reference to FIG. 11, the objects synchronization can be implemented by one or any combination of the following steps: the Presenter Plug-in (PP) generating a "Notification", as a binary object, such as an AS3 object; the Presenter Container (PC) converting the object to a String using serialization to byte array and then base64 encoding; posting the notification to the Message Bus Dispatcher Module (MBD), (for example, as a Base-64 serialized object using HTTP) wherein the string may include addressing information like a session ID, user ID, or both; the MBD collecting the string and sending it to the Message Bus Mailbox Module (MBM); sending the messages to one or more target Mailboxes (e.g., according to a UniCast or MultiCast addressing mode); sending a message polling request to the MBM, by the Viewer Container (VC); the MBM sending message list response to the VC; the VC converting the string using base-64 decoding back to a byte array and then back into an object using de-serialization; sending a Consume notification, as a binary object, to the Viewer Plug-in Application (VP); and consuming by the viewer machine or device the Notification, and performing according to the object's content. Any combination of the above steps may be implemented. Further, other steps or series of steps may be used.

It will be appreciated that the processes do not include a step of streaming or otherwise sending desktop information of one user to another user (e.g., from the presenter to the audience). Instead the particular object being worked on may be dispatched to the network of current users, such that the delta or changes in application state indicated by the object being dispatched can be rapidly and effectively sent to all instances or session participants, (e.g., using a standardized remote procedure call technology). The synchronization is facilitated by the usage of containers, to contain the applications and plug-ins being used for collaboration. The amount of information needed to be communicated between the users is thus minimized and may include substantially of (or even entirely of) the object deltas. In this way the containers enable connectionless (e.g., communication without a permanent link) notifications over HTTP, to facilitate effective synchronized collaboration (e.g., synchronized co-browsing) using collaborative web applications.

The deployment architecture and system for synchronizing collaborative web applications may enable deployment of spontaneous online-web-meetings for mass audiences. The methods of the present invention advantageously may be web-based, consume very low bandwidth (e.g., less than about 3 kbytes/second of upstream), be very rich in functionality due to its plug-in architecture that allows rapid deployment of applications (e.g., custom-made synchronized applications), or any combination thereof. The system and process of the present invention may be adapted to enable spontaneous initiation of a session, without significant downloading of applications or data; without the need to install and setup software in advance (e.g., as a popular browser plug-in may be used), or both. The system and process of the present invention may enabling the service to be utilized by mass audience (e.g., including users of relatively low capacity machines and/or data networks). It will be appreciated that the since the system is Web based and requires no installation of software or code, the platform may serve the masses of users, and may serve large audiences simultaneously without significant networking changes. Further, since the system consumes very low bandwidth, this may enable high level service provision to all customers, including those with low quality internet-connections, and there is no intrinsic need to add significant server power when the service is used by many concurrent users.

Further technological advantages include one or any combination of the following: no need for firewall or network address translation (i.e., NAT) configuration, (e.g., which may prevents a large audience of corporate users and people in large academy campuses from using the service); easy customization, allowing rapid deployment of tailored solutions and personalized look-and-feels for collaborative applications supplied to various market segments; easy deployment of customized collaborative applications by third parties that develop plug-ins (preferably using the documented plug-in API) and optionally deploy them from their own web-servers; or easy integration with existing web-sites, since customized collaborative applications may access various IT infrastructures.

Examples of synchronized applications that may run as plug-ins include: viewing documents together (e.g., implemented by uploading documents to the application server, converting the documents to Flash format files, downloading the flash format files to all participants, and presenting the documents and changes using a shared plug-in that renders the documents); collaborative form filling; shared text editing; shared video watching (e.g., Youtube or any other Flash format video stored on any server) (e.g., where the presenter and viewers will be fully synchronized so that all users can see exactly the same thing, when the presenter pauses, searches, highlights, edits, and the like; co-browsing (e.g., co-browsing of a map service such as Google maps); live presentations; viewing 3D models together; synchronized shopping carts; and using any type of calculator or financial analysis application.

Elements from external services, such as www.Interactive-Host.com, www.verishow.com and www.showdocument.com etc., may be integrated into the collaborative web browsing system. An external service may be integrated to enable one or more of: instant collaboration web-meeting sessions with, for example, form-filling tools, document sharing (e.g., an agent can load any document and immediately review it with a remote audience, using all MS-Office formats, pdf, text, images, videos, music etc. and annotate it etc.); deploy free co-browsing by an unlimited number of participants, same web-page loading on all participant's screens, including highlight and annotations etc.; usage of a variety of other collaborative applications like whiteboard, mutual text editor, watching YouTube videos etc., together in a synchronized way; using an open or Public API that enables any developer to create his or her own tailored collaborative applications, maintaining a document library on the server, for optional use during a session; optional Video and voice usage; capabilities of integration with other web-sites as "plug-ins" or "widgets" without any changes to the site itself; and providing a customized look and feel.

Collaborative Form Filling

The methods described herein may advantageously be employed in collaboratively filling in a form by two or more remote users. Synchronous collaboration allows the users to remotely interact with a document including editing or completing a document, reviewing a document, verifying or otherwise approving a document, or any combination thereof.

Figure 12B:
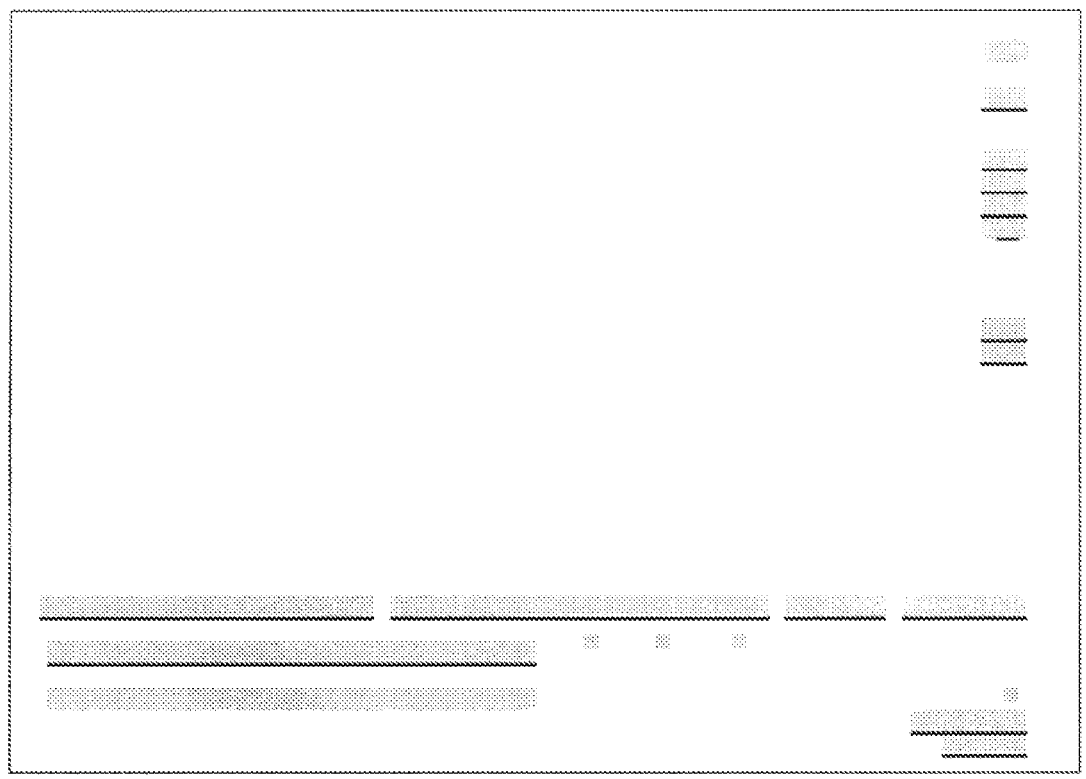
FIG. 12B is an illustrative set of editable fields (e.g., including editable text fields, editable check boxes, or a combination thereof) that may be obtained from the form (e.g., from the PDF format fillable form of FIG. 12A). The field locations and type preferably are converted to an XML file.
Figure 13:
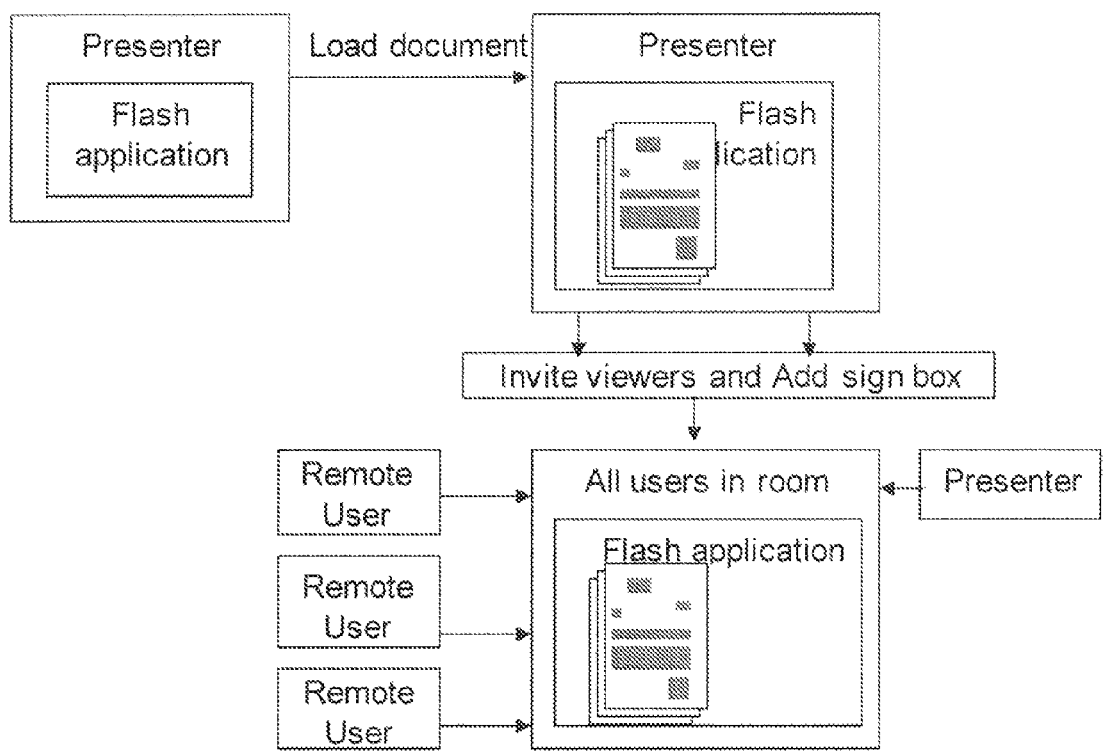
FIG. 13 is an illustrative flow chart of steps that may be employed in a collaborative form filling process.

The form to be collaboratively filled-in may be located on a server or a portion (or component) of a server, such as an application server. The form to be collaboratively filled-in may be located on one of the users. The form to be collaboratively filled-in may be stored remotely, such as on a remote web site. For collaboratively filling-in a form, the form needs to be a collaborative form, meaning a form that includes (preferably in separate files) a background portion (e.g., image portion) in a vector format, and an editable portion that includes the types and locations of the editable fields. As such, a collaborative form preferably is a set of files, including two or more files. A particularly preferred vector format is a flash format, such as a SWF format. The editable portion preferably is in an XML file format. If the form is not a collaborative form, the form may be converted into a collaborative form. By way of example, the collaborative form may be a form that includes both i) one or more editable fields and ii) one or more fields or objects that are not to be edited. Such a non-collaborative form may be processed using a script or other program to extract the editable portion and the background portion. The script may parse and "read" the form to identify the editable fields. For example, the script may locate "Text Fields" and "Checkboxes." The form may have one, two, or more pages, As such, the parsing may include parsing a single page, or parsing a plurality of pages. The same script or a different script may be employed to parse the objects in the form for generating the background portion. By way of example, a PDF format fillable form may be parsed to separate the editable portion and background portion. FIG. 13A illustrates a PDF form that includes editable fields and objects. This form may be parsed to obtain the editable fields, as illustrated in FIG. 12B. The PDF form may also be parsed to obtain the background or image, as illustrated in FIG. 12C. The editable fields and the background may be overlayed to results in a collaborative form having all of the features of the original form that was not a collaborative form.

Using the collaborative process already described, the collaborative form (e.g., the XML file and the SWF file) can be sent and/or transferred to the users. The collaboration application of a user may load the form background and place the editable fields in a layer on top of the form background. The editable fields may be placed in one layer or in a plurality of layers. The use of a plurality of layers for the editable fields may allow user (such as a presenter) can control the fields which are capable of being edited at any time by another user.

Figure 3:
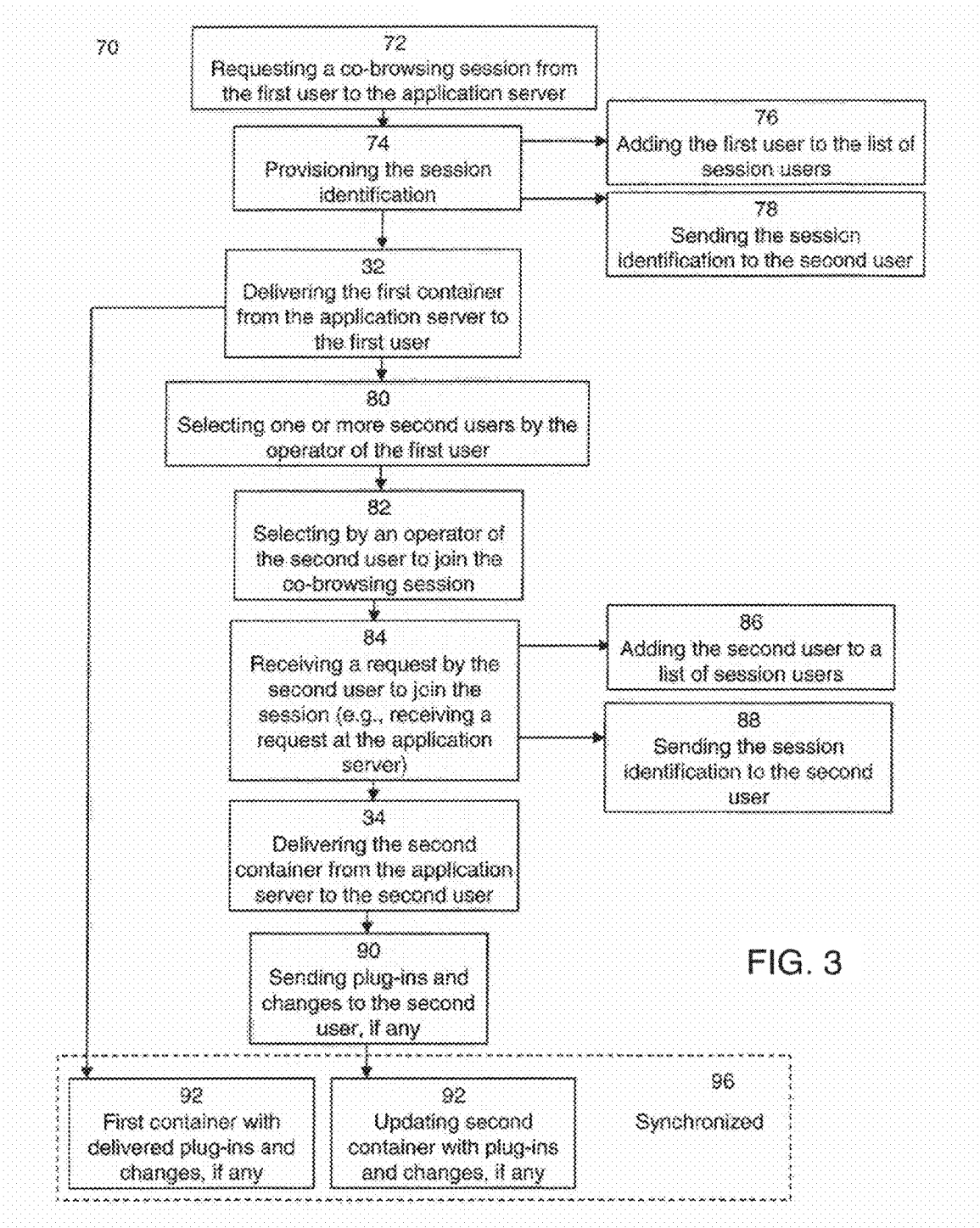
FIG. 3 is an illustrative flow chart of process steps that may be employed in setting up a synchronized collaboration session.

FIG. 3 is a flow chart illustrating a series of operations or processes that may be implemented to enable collaborative form filling between multiple remote users. The process may include a step of loading a document intended for collaborative form filling from a form provider or presenter. The document preferably is loaded using a flash application. The collaborative form may be created using the flash application, for example, by incorporating controls or fields into the document pages. A user (e.g., the presenter) may set up the document in an interactive virtual room or session. A user (e.g., the presenter) may invite one or more viewers or remote users into the room or session. One, two or more users (e.g., a remote user and the presenter) may interact with the form. Without limitation, two or more users my interact with the form by adding, editing or deleting a signature box, comments, graphics, new fields, and the like. At the end of a collaborative session or at any other time during the session, the modifications to the document, or the entire document including the modifications may be saved. Preferably the saving of the document or the modifications is to the application server. Preferably the document including the modifications is saved to a PDF file.

A collaboration session may be started, for example, when a first user (e.g., a remote user) enters the flash application. Once inside the flash application, the user may get a room number or other identifier for a virtual room, and optionally a password. The user may share the room number or other identifier with one or more additional users (e.g., by inviting one or more additional users to join the session (i.e., enter the virtual room)). After the collaborative form is delivered to the users, all the people in the current room can see each others actions performed on the document and/or interact/collaborate with the document.

With reference to FIG. 3, a collaborative session may include one or any combination of (e.g., all of) the following steps: a user (e.g., a first user) requesting a co-browsing session (e.g., by sending a request to an application server 72; a server (e.g., an application server) provisioning a session identification 74; a server adding the first user to the list of the session users 76; sending the session identification to the second user (e.g. from a server, such as the application server) 78; delivering the first container from the application server to the first user 32; selecting one or more second users by the operator of the first user 80; one or more second users selecting to join the co-browsing session 82 (by responding to a notification from the first user or otherwise); a server (e.g., an application server receiving a request from one or more second users to join the session 84; optionally verifying the identity of the first user, the second user or both; a server (e.g., the application server) adding the one or more second users to the list of session users (e.g., after verifying the identity of the second user) 86; a server (e.g., the application server) sending the session identification to the second user 88; delivering a second container (which may be the same or different from the first container) from the application server to the one or more second users 34; or sending plug-ins and any changes that have been made (e.g., from the first user, a different second user, or both) to the second user 90. The first container may be updated with any delivered plug-ins and any changes from the users 92 and the one or more second containers may be updated with any delivered plug-ins and any changes 92, so that the first container (e.g. of the first user) and the second container (e.g., of the one or more second users) are synchronized 96.

Figure 5:
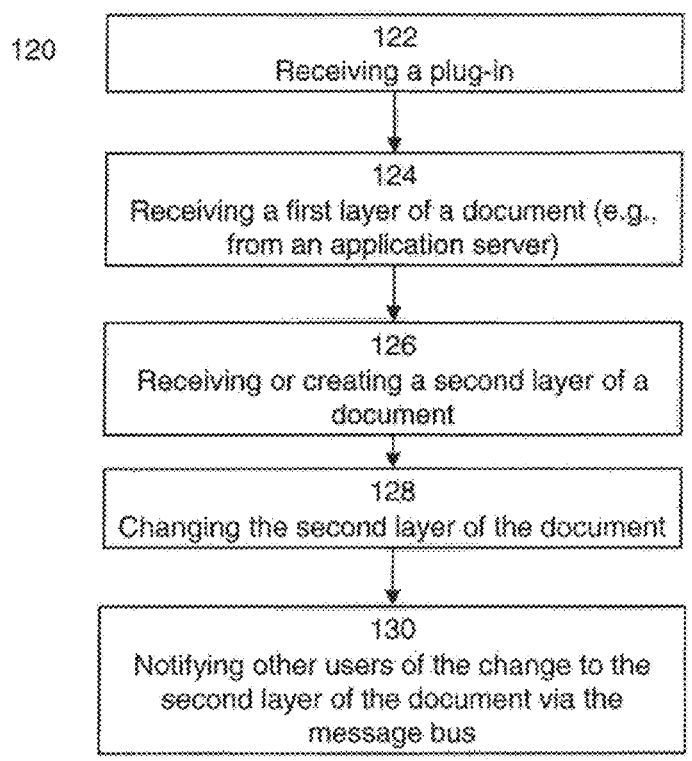
FIG. 5 is an illustrative flow chart of process steps that may be employed for synchronized collaboration of a document having a plurality of layers.

With reference to FIG. 5, the method for synchronized collaboration of a document having a plurality of layers 120 may include one or any combination of (e.g., all of) the following steps: receiving a plug-in 122 (e.g. by a first container, a second container, or preferably both); receiving a first layer of a documents 124 (e.g., by a first container, a second container, or preferably both), preferably from a server, such as an application server; receiving and/or creating a second layer of a document 126; changing the second layer of the document 128 (e.g., by the first user, the second user, or both); or notifying the other users of the change to the second layer of the document 130, preferably via the message bus.

Figure 6:
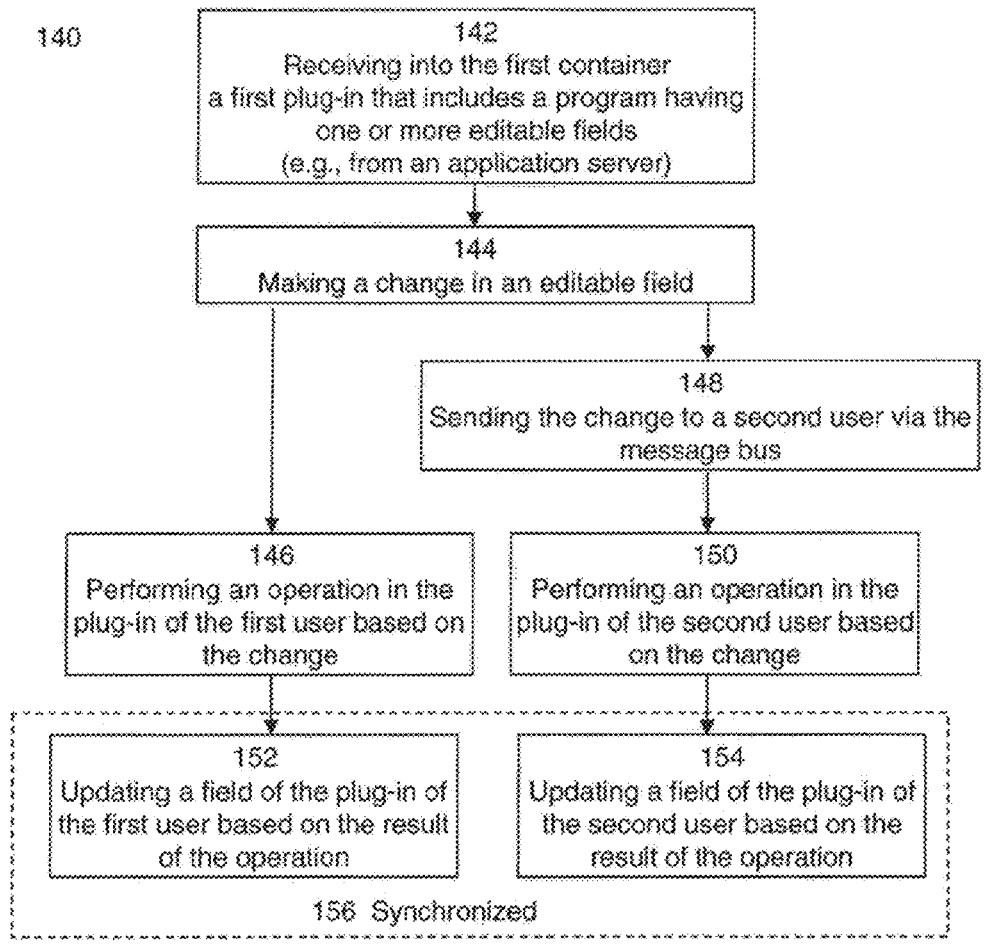
FIG. 6 is an illustrative flow chart of process steps that may be employed in synchronizing two users during a collaboration session using a message bus server.

With reference to FIG. 6, synchronizing two users during a collaboration session using a message bus server 140 may include one or any combination of (e.g., all of) the following steps: receiving (e.g., from an application server) into a container (e.g., the first container) a plug-in that includes a program or document having one or more editable fields 142; the making of a change in an editable 144 (e.g., from a user, such as the first user making a change to an editable field of the program/document in the first container); sending the change to one or more other users (e.g., to a second user) 148, preferably via the message bus; performing an operation in the plug-in of the first user and the second user based on the change 146, 150; updating the field of the plug-in of the user making the change (e.g., the first user) based on the result of the operation 152; or updating the field of the plug-in of the other users (e.g., the one or more second uses) based on the result of the operation 154. Preferably after the steps of updating the plug-in of the first user and the plug-in of the second user 152, 154, the users are synchronized 156.

As described hereinbefore, collaborative form filling may be used for filling a form that includes a means of verification, such as a signature box. FIG. 14 illustrates a verification box that may be included with a collaborative form or that may be added to a collaborative form. As illustrated in FIG. 14, the means of verification may include an electronic signature, an IP address, a time/date stamp, one or more confirmation checkboxes, or any combination thereof.

The collaborative form filling process 200 may include one or any combination of the steps illustrated in FIG. 15. The process may include a step of providing a form file 202 (e.g., from a server, a user, or otherwise) including one or more editable fields. The process may include a step of parsing 204 the form file into at least one background layer (e.g., a file) and at least one editable layer (e.g., a file). Each layer may be in a separate file. Different layers may also be combined into one file. The process may include a step of providing to a first user 206 the background layer and the editable layer to a form editing plug-in of the collaboration container of the first user. The process may include a step of providing to a second user 208 the background layer and the editable layer to a form editing plug-in of the collaboration container of the second user. During the collaboration session, the process may include a step of modifying a field 210 (i.e., making a change to a field) of the editable layer by an operator (e.g., an operator of the first user). The modification may be made using an input device. The process may include a step of sending 212 information about the modification from the first container to the message bus server using hypertext transfer protocol. The process may include a step of sending 214 the information about the modification from the message bus server to the container of the second user using hypertext transfer protocol. Upon receiving the information about the modification by the second user, the process may include a step of the second user updating 216 the editable layer in the form editing plug-in of the second user so that the editable layer of the first and second users are synchronized. This process may be repeated by multiple modifications by the first user. The second user may also make modification wherein the aforementioned roles of the first and second user are switched.

A collaboration session may also include synchronizing 240 the location of the cursor of one of the first user in the containers of the first and second users. This process may include a step of moving 242 the first user's cursor in the container of the first user. This may be accomplished by an operator of the first user moving an input device (e.g., a pointing device). The process may include a step of sending 244 information about the change in the location (e.g., the movement) of the first user's cursor and/or information about the location of the first user's cursor from the first container to the message bus server using hypertext transfer protocol. The process may include a step of sending 246 information about the change in the location of the first user's cursor and/or information about the location of the first user's cursor from the message bus server to the container of the second user using hypertext transfer protocol. The process may include a step of updating 248 the location of the first user's cursor in the container of the second user upon the second user receiving the information about the location or change in location of the first user's cursor. Using these steps, the location of the first user's cursor may be synchronized in the containers of the first user and the second user. This process may be repeated by multiple changes in the location of the first user's cursor. The second user may also make changes to the location of the second user's cursor, wherein the aforementioned roles of the first and second user are switched. Thus, the first and second users may be able to view each others cursor in a synchronized manner.

A presenter and a viewer may exchange roles during a session. For example, the current presenter container may have a button or link to transfer presenter rights to another one of other users. The new presenter may then inherit some or all of the presenter rights, until the rights are again transferred (e.g., to others or to the original presenter).

It will be appreciated that there may be no limit to the number of "viewers" or users during a session. For example, 2 or more users may co-browse or collaborate. The number of users may be greater than about 5, greater than about 10, greater than about 50, or greater than about 100. It is even conceivable that thousands of users or more may collaborate, e.g., without substantially adding server or network resources.

A Plug-in may be loaded from any third party web server, although typically the plug-ins may be loaded from the Application Server.

In various aspects of the invention, a "Current Tab Status" is available for participants who join in the middle of a session so that they can see exactly what the others see. A tab is an instant of a plugin, for example: one document may be shared in a plug-in but multiple instances can be opened at the same time with different documents, as Tabs. Alternatively there may be a single whiteboard plug-in, but multiple whiteboard tabs. For example, the mechanism of current-tab-status may take care of situations where viewers join the session in the middle. When this happens, the framework may open all the open tabs of the presenter for them, and sets the open tabs at the same state. In one example, if a document is opened as a Tab, it will open on the same scroll position as the presenter. In another example, if a video is opened it may Fast-Forward to the frame where the presenter is.

An operator of the first user may control who can edit a document in a plug-in. For example, the first user may be a presenter and a second user, or even all of the other users may be a viewer. As another example, the first user may control the ability of a second user to make a change (e.g., changes to a plug-in). As such the process may includes a step of passing a control to the second user so that the second user may make a change.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A process for collaboratively filling a collaborative form by two or more users each having their own respective web browser and input device comprising the steps of:
a) providing to each of the two or more users access to at least one server system that includes
   i) at least one message bus server component;
   ii) at least one application server component; and
   iii) at least one plug-in server component
   wherein the two or more users includes a first user and one or more second users;
b) delivering a first user's container from the at least one application server component to the web browser of the first user;
c) delivering a second user's container from the at least one server component to the web browser of the one or more second users, wherein the first user's container and the second user's container are the same as or different from each other;
d) receiving one or more requests from the first user for a first plug-in via the plug-in server component;
e) delivering to the first user's container the first plug-in from the plug-in server component;
f) notifying the second user of the one or more requests by delivering a notification through the message bus server component;
g) delivering to the second user via the plug-in server component a second plug-in compatible with the first plug-in, so that the first and second user are each substantially simultaneously able to access compatible plug-ins and operate the first and second plug-ins in a coordinated substantially synchronized manner for modifying and/or observing a common file associated with the first and second plug-ins; and
h) selecting a selected form to collaboratively fill by a form selector, wherein the form selector is one of the two or more users;
i) sending the selected form to the application server component, or sending a request for the form to the application server component whereupon the application server component retrieves the selected form, wherein the selected form is the collaborative form or a non-collaborative form;
j) converting the selected form into the collaborative form, with a proviso that the selected form is the non-collaborative form;
k) delivering the collaborative form to the plug-in of the form selector, wherein the collaborative form has one or more editable fields;
l) delivering the collaborative form to the plug-in of the two or more users other than the form selector;
m) following one or more modifications of the collaborative form made by the first user, communicating to the second user the one or more modifications, wherein the communicating is substantially contemporaneously with the modification, wherein the communicating takes place by
   i) serializing the one or more modifications to form a serialized string in the first user's container and sending the serialized string using an HTTP protocol;
   ii) posting the serialized string to the message bus server;
   iii) cloning the serialized string for sending to the second users;
   iv) de-serializing the serialized string to the one or more modifications in the second user's container; and
   v) consuming the one or more modifications by the second plug-in of the second user; wherein the collaborative form is the common file;
so that the one or more modifications are delivered to the second user without interference by a firewall.

2. The process of claim 1, wherein the process includes a step of creating or providing the selected form, wherein the selected form is the non-collaborative form and includes one or more editable fields and a background; and the process includes the step of converting the selected form into the collaborative form, wherein the collaborative form has an image component and an editable component, wherein the image component includes the background of the selected form and is in a vector format data file, and the editable component includes the one or more editable fields of the selected form and is in a textual format data file.

3. The process of claim 2, wherein the step of converting the selected form into the collaborative form includes a step of converting the selected form into a vector format data file, and then parsing the selected form to create the textual format data file that includes field positions and types.

4. The process of claim 2, wherein the process includes a step of sending the background of the collaborative form and the one or more editable fields to the first user's container and the second user's container, wherein the step of sending the background of the form and the one or more editable fields is free of a continuous TCP connection.

5. The process of claim 1, wherein the process includes the steps of upon receiving a second user modification of the common file via an input device of the second user, delivering from the second user's container to the message bus server component, a notification including a characterization of the second user modification of the common file, delivering the notification of the second modification or a variation thereof from the message bus server component to the first user's container; and updating the common file of the first user's container so that the common file in the plug-in of the first user and the common file in the plug-in of the second user are synchronized.

6. The process of claim 5, wherein the modification of the collaborative form by the first user includes modifying one or more characters; the second user modification of the common file includes modifying one or more characters; and the input device of the first user includes a keyboard, a mouse, a microphone, a touchpad, or a joystick; and
wherein the process includes the steps of:
(a) sending a plurality of messages from one of the one or more users to the message bus server component, wherein adjacent messages are spaced by a predetermined time interval; or
(b) sending a plurality of messages from the message bus server component to one of the one or more users, wherein adjacent messages are spaced by a predetermined time interval.

7. The process of claim 1, wherein the process includes a step of selecting the first plug-in by the first user, prior to the step of delivering the first plug-in to the first user's container; and the process includes one or more steps of adding, modifying, or deleting one of the one or more editable fields of the collaborative form in the first or second plug-in.

8. The process of claim 1, wherein the process includes one or more steps of modifying one of the one or more editable fields of the collaborative form by the second user, and following any second user modifications of the common file made by the second user, communicating to the first user, the second user modifications, wherein the communicating is substantially contemporaneously with the second user modifications, wherein the communicating takes place by
i) serializing the second user modification to form a second serialized string in the second user's container and sending the second serialized string using HTTP;
ii) posting the second serialized string to the message bus server;
iii) cloning the second serialized string for sending to the first user;
iv) de-serializing the second serialized string in the first user's container; and
v) consuming the second user modification by the first plug-in.

9. The process of claim 1, wherein
the collaborative form includes one or more selection boxes;
the collaborative from includes one or more fields or boxes capable of storing a digital signature; and
the process includes a step of digitally signing the collaborative form by the first user, the second user, or both;
wherein the selected form is a contract or other agreement, an application, a document to be published or presented, a questionnaire or survey, a statement that requires verification, or any combination thereof.

10. The process of claim 1, wherein the process includes one or any combination of the following steps:
a) storing the one or more modifications to the collaborative form;
b) converting the collaborative form and the one or more modifications into a pdf file; or
c) storing to the application server component the one or more modifications to the collaborative form.

11. The process of claim 1, wherein the process employ a non-continuous link between the second user and the message bus server component; and wherein the two or more users are each independently a computer, a mobile phone, a personal digital assistant, or an electronic tablet, and wherein the process includes one or more steps of adding, modifying, or deleting one or more of the editable fields.

12. The process of claim 1, wherein the process includes the step(s) of: (i) storing a file including one or more modification of the collaborative form, or information about the one or more modification of the collaborative form; or (ii) printing a document including one or more modifications of the collaborative form; or (iii) both (i) and (ii).

13. The process of claim 1, wherein the method includes synchronizing the common file of more than two users using the message bus server component, wherein the message bus server component implements a supplier/consumer notification service.

14. The process of claim 1, wherein the first user's container is an ActionScript application.

15. The process of claim 1, wherein: (i) the process is free of a step of streaming the one or more modifications via the message bus server component; or (ii) the process employs a non-continuous link between the second user and the message bus server component; or (iii) the process employs a non-constant transmission control protocol (TCP) connection between the message bus server component and the second user; or (iv) the process employs a non-constant TCP connection between the message bus server component and the second user; or (v) any combination of (i), (ii), (iii), and (iv).

16. The process of claim 1, wherein the first user's container includes a network layer and an application programming interface (API) for plug-ins, and the plug-in includes a notification supplier element and a consume element, wherein the process includes:
passing an object from the notification supplier element of the plug-in to the API of the first user's container,
passing the object to the network layer of the first user's container; and
passing the object to the message bus server component.

17. The process of claim 1, wherein the message bus server component includes a message bus dispatcher and a message bus mailbox module; the second user is established by receiving a web address for the application server component by the second user, and the second user connecting to the application server component in the web browser of the second user; and wherein the process includes the steps of: uploading a document to the application server component, converting the document to a flash format; and sending the flash format of the document to the first and second users; and wherein the first plug-in is sent to a network layer of the first user using HTTP protocol; and the one or more modifications to the collaborative form is a complex object.

18. The process of claim 1, wherein the second user includes volatile memory, and the process is free of a step of saving an executable file in the non-volatile memory of the second user; and the step of sending the background of the collaborative form and the one or more editable fields to the first user's container and the second user's container employs periodic HTTP requests and is free of a continuous TCP connection.

19. A file or document prepared by the process of claim 1, wherein the file or document is electronically stored, printed, graphically displayed, or any combination thereof.

20. A system for synchronizing collaborative web applications by a first user and a second users using a collaborative infrastructure including:
a) a data communication network;
b) a message bus server component coupled to the data communication network;
c) an application server component coupled to the data communication network;
d) a plug-in server component coupled to the data communication network;
e) a first user having a network browser and coupled to the data communication network;
f) a second user having a network browser and coupled to the data communication network; and
g) a common file, wherein the common file is a collaborative form; wherein the application server component is configured for
  i) delivering a first user's container to the network browser of a first user, and
  ii) delivering a second user's container to a second user;
wherein the plug-in server component is configured for
  i) delivering a plug-in to the first user's container upon receiving a request for the plug-in from the first user; and
  ii) delivering a plug-in to the second user's container user upon receiving a request for the plug-in from the second user;
wherein the first user's container is configured for converting modifications to a common file of the plug-in to a serialized string using HTTP for notifying the second user of the modification to the common file; and
wherein the message bus server component is configured for delivering a notification to the second user; so that the second user can synchronize the common file with the first user.

21. A process for co-browsing by two or more users each having their own respective web browser and input device comprising:
a) providing to each of the two or more users access to at least one server system that includes
  i) at least one message bus server component;
  ii) at least one application server component; and
  iii) at least one plug-in server component;
  wherein the two or more users includes a first user and one or more second users;
b) delivering a first container from the at least one application server component to the web browser of the first user;
c) delivering a second user's container from the at least one server component to the web browser of the one or more second users, wherein the first container and the second container are the same as or different from each other;
d) receiving one or more requests from the first user for a first plug-in via the plug-in server component;
e) delivering to the first container the first plug-in from the plug-in server component;
f) notifying the second user of the one or more requests by delivering a notification through the message bus server component;
g) delivering to the second user via the plug-in server component a second plug-in compatible with the first plug-in, so that the first and second user are each substantially simultaneously able to access compatible plug-ins and operate the first and second plug-ins in a coordinated substantially synchronized manner for modifying and/or observing a common file associated with the first and second plug-ins; and
h) selecting a selected page for co-browsing, wherein the selected page is selected by one of the two or more users;
i) sending the selected page for co-browsing to the application server component, or sending a request for the selected page to the application server component whereupon the application server component retrieves the selected page;
j) delivering the selected page for co-browsing to the plug-in of the other user;
k) following one or more modifications of the selected page for co-browsing made by the first user, communicating to one or more of the other users, the one or more modifications, wherein the communicating is substantially contemporaneously with the modification, wherein the communicating takes place by
  i) serializing the modification to form a serialized string in the container of the first user and sending serialized the string using an HTTP protocol;
  ii) posting the serialized string to the message bus server;
  iii) cloning the serialized string for sending to the second users;
  iv) de-serializing the serialized string to the modification in the second user's container; and
  v) consuming the modification by the second plug-in of the second user;
  wherein the page for co-browsing is the common file;
  so that the modification is delivered to the second user without interference by a firewall.

22. A system for synchronizing collaborative web applications by a first user and a second users using a collaborative infrastructure including:
a) a data communication network;
b) a message bus server component coupled to the data communication network;
c) an application server component coupled to the data communication network;
d) a plug-in server component coupled to the data communication network;
e) a first user having a network browser and coupled to the data communication network;
f) a second user having a network browser and coupled to the data communication network; and
g) a common file, wherein the common file is a page for co-browsing;
wherein the application server component is configured for
  i) delivering a first container to the network browser of a first user, and
  ii) delivering a second container to a second user;
wherein the plug-in server component is configured for
  i) delivering a plug-in to the container of the first user upon receiving a request for the plug-in from the first user; and
  ii) delivering a plug-in to the container of the second user upon receiving a request for the plug-in from the second user;
wherein the first container is configured for converting modifications to a common file of the plug-in to a serialized string using HTTP for notifying the second user of the modification to the common file; and
wherein the message bus server component is configured for delivering the notifications to the second user; so that the second user can synchronize the common file with the first user.

* * * * *